US012330160B2

(12) United States Patent
Sheng et al.

(10) Patent No.: US 12,330,160 B2
(45) Date of Patent: Jun. 17, 2025

(54) MICROFLUIDIC PLATFORM FOR EVALUATION OF LIQUID INTERFACES

(71) Applicant: THE TEXAS A&M UNIVERSITY SYSTEM, College Station, TX (US)

(72) Inventors: Jian Sheng, College Station, TX (US); Andrew R. White, College Station, TX (US); Maryam Jalali, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 183 days.

(21) Appl. No.: 17/318,763

(22) Filed: May 12, 2021

(65) Prior Publication Data

US 2021/0354144 A1 Nov. 18, 2021

Related U.S. Application Data

(60) Provisional application No. 63/023,423, filed on May 12, 2020.

(51) Int. Cl.
*B01L 3/00* (2006.01)

(52) U.S. Cl.
CPC ... *B01L 3/502784* (2013.01); *B01L 3/502715* (2013.01); *B01L 2200/027* (2013.01); *B01L 2300/12* (2013.01)

(58) Field of Classification Search
CPC ......... B01L 3/502784; B01L 3/502715; B01L 2200/027; B01L 2300/12
See application file for complete search history.

(56) References Cited

U.S. PATENT DOCUMENTS

2005/0272159 A1* 12/2005 Ismagilov ................. B01L 7/52 436/34
2009/0023155 A1* 1/2009 Abbott ....................... C08J 5/20 435/7.1
2012/0168010 A1* 7/2012 Bauer ................. B81C 1/00119 427/535

OTHER PUBLICATIONS

Bauer et al, "Hydrophilic PDMS microchannels for high-throughput formation of oil-in-water microdroplets and water-in-oil-in-water double emulsions", Lab Chip, May 5, 2010, 10, 1814-1819. (Year: 2010).*
Alexander K. Price and Brian M. Paegel, "Discovery in Droplets", Jan. 5, 2016, Analytical Chemistry, 88 (1), 339-353 (Year: 2016).*

* cited by examiner

*Primary Examiner* — Dennis White
(74) *Attorney, Agent, or Firm* — Barnes & Thornburg LLP

(57) ABSTRACT

The present disclosure relates to a microfluidic channel composition configured for establishing a liquid-liquid interface and a microfluidic platform comprising the microfluidic channel composition. More particularly, the present disclosure includes a microfluidic platform for analyzing oil-aqueous interface interactions and methods utilizing the platform, for instance to evaluate environmental settings where oil may be present.

20 Claims, 13 Drawing Sheets

MICROFLUIDIC PLATFORM FOR EVALUATION OF LIQUID INTERFACES

CROSS-REFERENCE TO RELATED APPLICATIONS

This application claims priority under 35 U.S.C. § 119(e) to U.S. Provisional Application No. 63/023,423, filed on May 12, 2020, the entire disclosure of which is incorporated herein by reference.

GOVERNMENT SUPPORT STATEMENT

This invention was made with government support under W911NF-17-1-0371 awarded by the Department of Defense/Army Research Office. The invention was made with government support under SA15-19/UTA16-000545 awarded by the Gulf of Mexico Research Initiative. The invention was made with government support under SA18-17/UTA17-001449 awarded by the Consortium for Ocean Leadership. The government has certain rights in the invention.

TECHNICAL FIELD

The present disclosure relates to a microfluidic channel composition configured for establishing a liquid-liquid interface and a microfluidic platform comprising the microfluidic channel composition. More particularly, the present disclosure includes a microfluidic platform for analyzing oil-aqueous interface interactions and methods utilizing the platform, for instance to evaluate environmental settings where oil may be present.

BACKGROUND AND SUMMARY

The study of liquid-liquid interfaces chemistry with realistic topography and surface chemistry is an important consideration in a number of research and industry settings. In particular, an understanding of the physicochemical and hydrodynamical characteristics of a liquid-liquid interface on a micron scale, and even smaller, is greatly desired. Several recent environmental disasters have accelerated the need to understand these complex interactions. For instance, the Deepwater Horizon disaster produced clouds of insoluble oil droplets that rose through the water column, producing disastrous environmental consequences that will require years to fully comprehend.

However, producing a stable liquid-liquid interface for analysis at a micron scale is challenging. Moreover, the ideal interface would desirably have particular surface characteristics and also provide a long stability in order to evaluate lengthy complex processes, such as particle adsorption, desorption, nanomaterial accumulation, and chemical reactions. There are currently no known technologies known in the art. Therefore, there exists a need for new platforms and methods that can provide analyses of liquid-liquid interactions on the desired scale and duration.

Accordingly, the present disclosure provides a microfluidic channel composition and a microfluidic platform comprising the microfluidic channel composition, as well as associated analytical methods. The described compositions and methods are capable of analyzing liquid-liquid interactions on a micron scale by utilizing the novel platform in various applications.

The compositions and methods of the present disclosure provide several advantages and improvements compared to the state of the art. In particular, direct and long-term observation at the micron scale of physicochemical processes at oil-water interfaces which are relevant to their macro-scale equivalent has been previously unattainable. The described compositions will accelerate research and development activities and has the potential to provide critical results for healthcare, environmental, energy, food, and cosmetic industries. Further, the compositions and methods provide the ability to evaluate oil-water interfaces in a microfluidic environment that faithfully mimics their real-world counterparts as well as the ability to maintain these interfaces at stable conditions for long durations to evaluate processes that are extremely challenging to directly observe.

In illustrative embodiments, a microfluidic channel composition is provided. The microfluidic channel composition is configured for presentation of a liquid-liquid interface, wherein the microfluidic channel composition comprises a polymer.

In illustrative embodiments, a microfluidic platform comprising the microfluidic channel composition is provided.

In illustrative embodiments, a method of analyzing an oil droplet is provided. The method comprises the steps of immobilizing the oil droplet in the microfluidic platform and interacting a liquid composition comprising bacteria with the oil droplet.

In illustrative embodiments, a method of analyzing a chemical or biological process is provided. The method comprises the steps of immobilizing an oil droplet in the microfluidic platform and interacting a liquid composition with the oil droplet.

In illustrative embodiments, a method of fabricating a microfluidic channel composition configured for establishing a liquid-liquid interface, wherein the microfluidic channel composition comprises a polymer, is provided.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures:

FIGS. 1A-1B shows effects of the hydrophilic polyelectrolyte coating. A DI water sessile droplet rests on (FIG. 1A) an untreated PDMS surface with a contact angle of 110°; on (FIG. 1B) a deconstructed microchannel functionalized using the polyelectrolyte multilayer with a contact angle of 20°. Crude oil water interface in an (FIG. 1C) untreated and (FIG. 1D) treated microchannel filled with water resulting in oleophilic (FIG. 1C) and oleophobic (FIG. 1D) contact angle respectively. Scales: 1 mm in (FIG. 1A) and (FIG. 1B); 100 μm in (FIG. 1C) and (FIG. 1D).

FIG. 2 displays an exemplary set up of the microfluidic platform. Particle suspension or microbial culture is contained in the reservoir. A second pump ("peristaltic pump") draws the suspension or culture into the recirculating "culture loop" (box enclosed by dashed lines). The first pump ("precision pump") draws sample from the "culture loop" and into the microfluidic channel ("microchannel") where it encounters the oil droplet (dark circle) and observations are made through an instrument ("objective") before returning to the reservoir. Inset (at right) shows flow focusing junction where a single oil droplet is generated.

FIG. 3 shows a schematic of the microfluidic platform during a microcosm experiment. Side view of a pinned oil droplet in the microchannel viewed directly by a Nikon microscope.

FIGS. 4A-4F show micrographs of polymeric aggregates formed on an oil droplet by three different bacterial isolates with distinctive differences in aggregate morphology: (FIGS. 4A-4B) *Alcanivorax borkumensis*, (FIGS. 4C-4D) *Marinobacter hydrocarbonoclasticus*, and (FIGS. 4E-4F) *Pseudomonas* sp. (P62), The elapsed time since the first encounter with the bacterial suspension is annotated on the bottom right of each image. Scale: 100 μm.

FIGS. 5A-5F show characterization of hydrodynamic flow around a rising oil droplet with extracellular polymeric substance aggregation with microfluidic platform. (FIG. 5A) a single frame from a high speed image sequence showing bacterial motion. Arrow: cell displacement. (FIG. 5B) Close-up of (FIG. 5A) showing cell velocity near the droplet surface. Bright rod-like spot: an in-focus image of *Pseudomonas* cell. (FIG. 5C) Flow velocity map around a rising droplet with two trailing "streamers". The velocity vectors are overlaid with a single image frame. Only every $5^{th}$ and $7^{th}$ vector is shown in the cross-flow (y) and stream-wise (x) direction, respectively. (FIG. 5D) Close-up of flow map at the region near two "streamers", marked by black rectangle in (FIG. 5C). Here every vector in y axis and every $2^{nd}$ a vector in x-axis is shown. Bacteria "trapped" along two separate transparent EPS streamers are highlighted in a pseudo color, red. (FIG. 5E) Normalized velocity magnitude map. Left-half: cross-stream (v*), Right-half: streamwise (u*) components. (FIG. 5F) Normalized viscous stresses. Left-half: streamwise normal stress. $\tau_{xx}^*=\partial^{*2}u^*/(\partial^*x^*)^2$. Right-half: shear stress, $\tau_{xy}^*=[\partial^2u^*/(\partial^*y^*)^2+\partial^{*2}v^*/(a^*x^*)^2]/2$. Scale: (FIG. 5A. 5C, 5D) 100 μm, (5B, 5D, 5F) 10 μm.

FIGS. 6A-6H show a schematic of the layer-by-layer hydrophilic functionalization process. (FIG. 6A) PDMS and glass surfaces (solid gray) are activated using air plasma. (FIG. 6B) PAH is injected into the channel and adsorbed to walls, while unabsorbed PAH remains suspended (circles). (FIG. 6C) The channel is rinsed with NaCl solution to remove the suspended PAH. (FIG. 6D) PSS is injected and adsorbed to the PAH layer, while unabsorbed PSS remains suspended (triangles). (FIG. 6E) NaCl solution wash removes unadsorbed PSS. (FIG. 6F) A second layer of PAH is adsorbed to the first PSS layer. (FIG. 6G) A completed multilayer is deposited with PSS as the final layer. (FIG. 6H) The hydrophilic walls effectively create an oleophobic microfluidics.

FIGS. 7A-7G show a gallery of a single oil droplet in flows with various dense suspensions containing (FIG. 7A) sterile 1 μm latex beads ($10^8$ bds·ml$^{-1}$) in DI water ($Re_{D_d}$=0.4); (FIG. 7B) sterile 1 μm latex beads ($10^8$ bds·ml$^{-1}$) with minor bacterial contamination ($OD_{600}$<0.01) in DI water ($Re_{D_d}$=0.4); (FIG. 7C) sterile 1 μm latex beads ($10^8$ bds·ml$^{-1}$) spiked with *Sagitulla stelleta* ($OD_{600}$<0.01) in sterilized Artificial Seawater (ASW, 25 ppt) with purified Extracellular Polymeric Substances (EPS, 10 mg·l$^{-1}$) from *Sagitulla stelleta* ($Re_{D_d}$=0.2); (FIG. 7D) sterile 1 μm latex beads ($10^8$ bds·ml$^{-1}$) in ASW (25 ppt) with purified EPS (1 mg·l$^{-1}$) from natural Gulf of Mexico microbial assemblage ($Re_{D_d}$=0.2); (FIG. 7E-7G) in situ cultured *Pseudomonas* sp (strain P62, 0.35<$OD_{600}$<0.56) in marine nutrient broth. Time lapsed micrographs of an oil droplet passing through *Pseudomonas* suspension recorded at Δt=16 min (FIG. 7E) and 50 min (FIG. 7F) immediately after the droplet encounters bacterial suspension, when several streamers are initiated (FIG. 7E) and a long streamer bundle is formed (FIG. 7F) respectively ($Re_{D_d}$=0.4). (FIG. 7G) Multiple pinned droplets are interconnected by a web of EPS aggregates and streamers to form a larger oily aggregate after 120 h exposure to *Pseudomonas* (P62) suspension ($Re_{D_d}$=1.6). Flow is downward in all panels. All images are taken using differential interference contrast (DIC) except for (FIG. 7C) with phase contrast. Scale: 100 μm.

FIGS. 8A-8F show micrographs of a crude oil droplet in a flow containing *Pseudomonas* sp. (P62) at various times immediately after its exposure to bacterial suspension. Δt, of (FIG. 8A) 12 min, (FIG. 8B) 12.5 min. (FIG. 8C) 40 min. (FIG. 8D) 4 h 50 min, (FIG. 8E) 21 h 33 min, and (FIG. 8F) 30 h 53 min. They show stages of EPS streamers around an oil droplet as (FIG. 8A) smooth drop. (FIG. 8B) streamer initiation. (FIG. 8C) bundling, (FIG. 8D) proliferation and aggregation. (FIG. 8E) dispersal, and (FIG. 8F) reformation. The flow ($Re_{D_d}$=0.4) is downward in all panels. Scale: 100 μm.

FIGS. 9A-9D show flow measurements around an oil droplet with and without trailing streamers. (FIG. 9A) Sample instantaneous tracer particle velocity (only 0.5% of total ~$3\times10^6$ vectors are shown). Dot: location of the cell, Arrow: velocity. Mean flow velocity fields around (FIG. 9B) a smooth droplet (Δt=20 min) and (FIG. 9C) a droplet with two streamers (Δt=30 min) superimposed onto their velocity magnitudes (colored contour). Each mean field is averaged over 999 instantaneous realizations. (FIG. 9D) Superimposed streamlines from (FIG. 9B)—black dotted lines and (FIG. 9C)—red solid lines showing the hydrodynamic impact of single or several streamer filaments on flow around a drop. The flow ($Re_{D_d}$=0.4) is in the positive x-direction.

FIGS. 10A-10G show distributions of normalized pressure gradient magnitude, $|\nabla^*p^*|$, around an oil droplet in the first 80 min immediately after exposure to *Pseudomonas* (P62) at the time. Δt, of (FIG. 10A) 20. (FIG. 10B) 30. (FIG. 10C) 40, (FIG. 10D) 50, (FIG. 10E) 60, (FIG. 10F) 70, and (FIG. 10G) 80 min. The filamentary regions with elevated pressure gradient magnitudes highlight instantaneous locations and shapes of streamers as they are initiated over and detached from the droplet sporadically. Streamlines are superimposed in (FIG. JOB) to illustrate the crossing of streamers by streamlines. The flow ($Re_{D_d}$=0.4) is in the positive x-direction.

FIG. 11 shows time evolution of mean drag coefficient. $C_d$, normalized by that of a smooth droplet. $C_{d,0}$ for Δt=20 to 100 min. Annotations indicate corresponding $|\nabla^*p^*|$ contours from FIGS. 10A-10G. Hollow circle: no streamers; Filled circle: with streamer(s); Error bars: one standard deviation. $Re_{D_d}$=0.4.

DETAILED DESCRIPTION

Figures 1A, 1B, 1C, 1D:
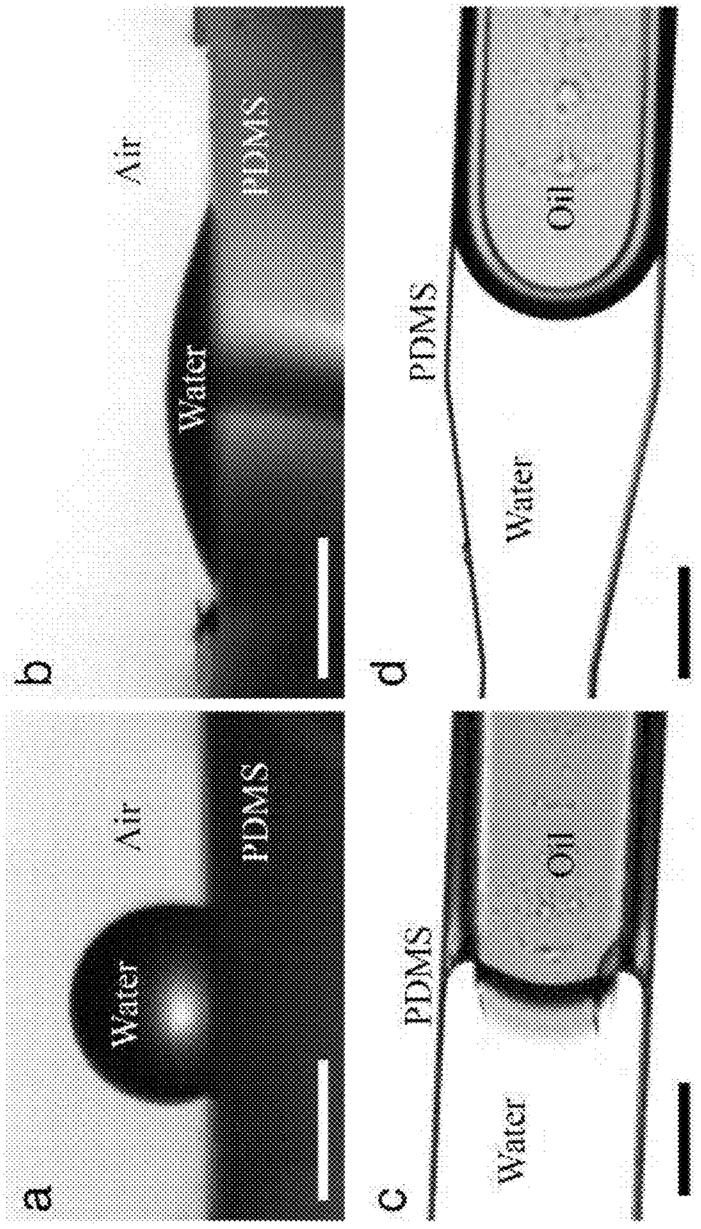

The following numbered embodiments are contemplated and are non-limiting:

1. A microfluidic channel composition configured for establishing a liquid-liquid interface, wherein the microfluidic channel composition comprises a polymer.
2. The microfluidic channel composition of clause 1, any other suitable clause, or any combination of suitable clauses, wherein the liquid-liquid interface is an oil-aqueous interface.
3. The microfluidic channel composition of clause 1, any other suitable clause, or any combination of suitable clauses, wherein the polymer is a transparent co-polymer.
4. The microfluidic channel composition of clause 3, any other suitable clause, or any combination of suitable clauses, wherein the transparent copolymer is selected from the group consisting of poly(dimethylsiloxane) (PDMS), poly(methyl methacrylate) (PMMA), ethylene-vinyl acetate, and nylon.
5. The microfluidic channel composition of clause 1, any other suitable clause, or any combination of suitable clauses, wherein the polymer is a thermoplastic.
6. The microfluidic channel composition of clause 5, any other suitable clause, or any combination of suitable clauses, wherein the thermoplastic is polytetrafluoroethylene (PTFE).
7. The microfluidic channel composition of clause 5, any other suitable clause, or any combination of suitable clauses, wherein the thermoplastic is an acrylic.
8. The microfluidic channel composition of clause 1, any other suitable clause, or any combination of suitable clauses, wherein the polymer is a thiol-ene polymer system.
9. The microfluidic channel composition of clause 1, any other suitable clause, or any combination of suitable clauses, wherein the polymer is a thiol-yne polymer system.
10. The microfluidic channel composition of clause 1, any other suitable clause, or any combination of suitable clauses, wherein the polymer is a polyurethane.
11. The microfluidic channel composition of clause 1, any other suitable clause, or any combination of suitable clauses, wherein the polymer is poly(dimethyliloxane) (PDMS).
12. The microfluidic channel composition of clause 1, any other suitable clause, or any combination of suitable clauses, wherein the polymer is bonded to glass.
13. The microfluidic channel composition of clause 12, any other suitable clause, or any combination of suitable clauses, wherein the glass is a glass slide.
14. The microfluidic channel composition of clause 13, any other suitable clause, or any combination of suitable clauses, wherein the glass slide is a glass microscope slide.
15. The microfluidic channel composition of clause 12, any other suitable clause, or any combination of suitable clauses, wherein the polymer is bonded to the glass via air plasma.
16. The microfluidic channel composition of clause 1, any other suitable clause, or any combination of suitable clauses, wherein the microfluidic channel composition comprises at least two inner walls.
17. The microfluidic channel composition of clause 16, any other suitable clause, or any combination of suitable clauses, wherein the two inner walls are configured to form a channel in the microfluidic channel composition.
18. The microfluidic channel composition of clause 16, any other suitable clause, or any combination of suitable clauses, wherein at least one wall is hydrophilic.
19. The microfluidic channel composition of clause 16, any other suitable clause, or any combination of suitable clauses, wherein at least one wall is hydrophobic.
20. The microfluidic channel composition of clause 16, any other suitable clause, or any combination of suitable clauses, wherein the two inner walls are hydrophilic.
21. The microfluidic channel composition of clause 16, any other suitable clause, or any combination of suitable clauses, wherein the two inner walls are hydrophobic.
22. The microfluidic channel composition of clause 16, any other suitable clause, or any combination of suitable clauses, wherein at least one wall is negatively charged.
23. The microfluidic channel composition of clause 16, any other suitable clause, or any combination of suitable clauses, wherein at least one wall is positively charged.
24. The microfluidic channel composition of clause 16, any other suitable clause, or any combination of suitable clauses, wherein the two inner walls are negatively charged.
25. The microfluidic channel composition of clause 16, any other suitable clause, or any combination of suitable clauses, wherein the two inner walls are positively charged.
26. The microfluidic channel composition of clause 16, any other suitable clause, or any combination of suitable clauses, wherein at least one wall comprises poly (allylamine hydrochloride) (PAH).
27. The microfluidic channel composition of clause 26, any other suitable clause, or any combination of suitable clauses, wherein the wall comprising PAH is positively charged.
28. The microfluidic channel composition of clause 16, any other suitable clause, or any combination of suitable clauses, wherein at least one wall comprises poly (sodium 4-styrenesulfonate) (PSS).
29. The microfluidic channel composition of clause 28, any other suitable clause, or any combination of suitable clauses, wherein the wall comprising PSS is negatively charged.
30. The microfluidic channel composition of clause 16, any other suitable clause, or any combination of suitable clauses, wherein at least one wall comprises PAH and PSS.
31. The microfluidic channel composition of clause 30, any other suitable clause, or any combination of suitable clauses, wherein the PAH and the PSS are configured in layers on the wall.
32. The microfluidic channel composition of clause 30, any other suitable clause, or any combination of suitable clauses, wherein the PAH and the PSS are configured in alternating layers on the wall.
33. The microfluidic channel composition of clause 30, any other suitable clause, or any combination of suitable clauses, wherein the wall is negatively charged.
34. The microfluidic channel composition of clause 30, any other suitable clause, or any combination of suitable clauses, wherein the wall is positively charged.
35. The microfluidic channel composition of clause 30, any other suitable clause, or any combination of suitable clauses, wherein the wall is hydrophilic.

36. The microfluidic channel composition of clause 30, any other suitable clause, or any combination of suitable clauses, wherein the wall is hydrophobic.
37. The microfluidic channel composition of clause 1, any other suitable clause, or any combination of suitable clauses, wherein the microfluidic channel composition comprises one or more fluid ports.
38. The microfluidic channel composition of clause 1, any other suitable clause, or any combination of suitable clauses, wherein the microfluidic channel composition comprises two or more fluid ports.
39. The microfluidic channel composition of clause 1, any other suitable clause, or any combination of suitable clauses, wherein the microfluidic channel composition comprises three or more fluid ports.
40. The microfluidic channel composition of clause 1, any other suitable clause, or any combination of suitable clauses, wherein the microfluidic channel composition comprises four or more fluid ports.
41. The microfluidic channel composition of clause 40, any other suitable clause, or any combination of suitable clauses, wherein the fluid ports are selected from the group consisting of i) an inlet configured for input of a solution or suspension, ii) an outlet configured for output of a solution or suspension, iii) an input configured for input of a buffer, and iv) an input configured for input of an oil.
42. The microfluidic channel composition of clause 1, any other suitable clause, or any combination of suitable clauses, wherein the microfluidic channel composition comprises four fluid ports.
43. The microfluidic channel composition of clause 42, any other suitable clause, or any combination of suitable clauses, wherein a first fluid port is an inlet configured for input of a liquid composition.
44. The microfluidic channel composition of clause 43, any other suitable clause, or any combination of suitable clauses, wherein the liquid composition is blood.
45. The microfluidic channel composition of clause 43, any other suitable clause, or any combination of suitable clauses, wherein the liquid composition is blood plasma.
46. The microfluidic channel composition of clause 43, any other suitable clause, or any combination of suitable clauses, wherein the liquid composition is a solution.
47. The microfluidic channel composition of clause 46, any other suitable clause, or any combination of suitable clauses, wherein the solution is a bacterial-containing solution.
48. The microfluidic channel composition of clause 46, any other suitable clause, or any combination of suitable clauses, wherein the solution is a viral-containing solution.
49. The microfluidic channel composition of clause 46, any other suitable clause, or any combination of suitable clauses, wherein the solution is a microorganism-containing solution.
50. The microfluidic channel composition of clause 46, any other suitable clause, or any combination of suitable clauses, wherein the solution is an antibody-containing solution.
51. The microfluidic channel composition of clause 46, any other suitable clause, or any combination of suitable clauses, wherein the solution is a particle-containing solution.
52. The microfluidic channel composition of clause 43, any other suitable clause, or any combination of suitable clauses, wherein the liquid composition is a suspension.
53. The microfluidic channel composition of clause 52, any other suitable clause, or any combination of suitable clauses, wherein the suspension is a bacterial-containing suspension.
54. The microfluidic channel composition of clause 52, any other suitable clause, or any combination of suitable clauses, wherein the solution is a viral-containing suspension.
55. The microfluidic channel composition of clause 52, any other suitable clause, or any combination of suitable clauses, wherein the solution is a microorganism-containing suspension.
56. The microfluidic channel composition of clause 52, any other suitable clause, or any combination of suitable clauses, wherein the suspension is an antibody-containing suspension.
57. The microfluidic channel composition of clause 52, any other suitable clause, or any combination of suitable clauses, wherein the suspension is a particle-containing suspension.
58. The microfluidic channel composition of clause 42, any other suitable clause, or any combination of suitable clauses, wherein a second fluid port is an outlet configured for output of a liquid composition.
59. The microfluidic channel composition of clause 58, any other suitable clause, or any combination of suitable clauses, wherein the liquid composition is blood.
60. The microfluidic channel composition of clause 58, any other suitable clause, or any combination of suitable clauses, wherein the liquid composition is blood plasma.
61. The microfluidic channel composition of clause 58, any other suitable clause, or any combination of suitable clauses, wherein the liquid composition is a solution.
62. The microfluidic channel composition of clause 61, any other suitable clause, or any combination of suitable clauses, wherein the solution is a bacterial-containing solution.
63. The microfluidic channel composition of clause 61, any other suitable clause, or any combination of suitable clauses, wherein the solution is a viral-containing solution.
64. The microfluidic channel composition of clause 61, any other suitable clause, or any combination of suitable clauses, wherein the solution is a microorganism-containing solution.
65. The microfluidic channel composition of clause 61, any other suitable clause, or any combination of suitable clauses, wherein the solution is an antibody-containing solution.
66. The microfluidic channel composition of clause 61, any other suitable clause, or any combination of suitable clauses, wherein the solution is a particle-containing solution.
67. The microfluidic channel composition of clause 58, any other suitable clause, or any combination of suitable clauses, wherein the liquid composition is a suspension.
68. The microfluidic channel composition of clause 67, any other suitable clause, or any combination of suitable clauses, wherein the suspension is a bacterial-containing suspension.

69. The microfluidic channel composition of clause 67, any other suitable clause, or any combination of suitable clauses, wherein the solution is a viral-containing suspension.
70. The microfluidic channel composition of clause 67, any other suitable clause, or any combination of suitable clauses, wherein the solution is a microorganism-containing suspension.
71. The microfluidic channel composition of clause 67, any other suitable clause, or any combination of suitable clauses, wherein the suspension is an antibody-containing suspension.
72. The microfluidic channel composition of clause 67, any other suitable clause, or any combination of suitable clauses, wherein the suspension is a particle-containing suspension.
73. The microfluidic channel composition of clause 42, any other suitable clause, or any combination of suitable clauses, wherein a third fluid port is an input configured for input of a buffer.
74. The microfluidic channel composition of clause 73, any other suitable clause, or any combination of suitable clauses, wherein the buffer is water.
75. The microfluidic channel composition of clause 73, any other suitable clause, or any combination of suitable clauses, wherein the buffer is a saline-containing buffer.
76. The microfluidic channel composition of clause 42, any other suitable clause, or any combination of suitable clauses, wherein a fourth fluid port is an input configured for input of an oil.
77. The microfluidic channel composition of clause 1, any other suitable clause, or any combination of suitable clauses, wherein the microfluidic channel composition comprises a coaxial nozzle.
78. The microfluidic channel composition of clause 77, any other suitable clause, or any combination of suitable clauses, wherein the coaxial nozzle is capable of immobilization of an oil droplet in the microfluidic channel composition.
79. The microfluidic channel composition of clause 77, any other suitable clause, or any combination of suitable clauses, wherein the coaxial nozzle comprises a flow-focusing junction.
80. The microfluidic channel composition of clause 1, any other suitable clause, or any combination of suitable clauses, wherein the microfluidic channel composition comprises an oil droplet.
81. The microfluidic channel composition of clause 80, any other suitable clause, or any combination of suitable clauses, wherein the oil droplet is circular.
82. The microfluidic channel composition of clause 80, any other suitable clause, or any combination of suitable clauses, wherein the oil droplet is between 1 μm and 1000 μm in size.
83. The microfluidic channel composition of clause 80, any other suitable clause, or any combination of suitable clauses, wherein the oil droplet is between 1 μm and 100 μm in size.
84. The microfluidic channel composition of clause 80, any other suitable clause, or any combination of suitable clauses, wherein the oil droplet is between 100 μm and 200 μm in size.
85. The microfluidic channel composition of clause 80, any other suitable clause, or any combination of suitable clauses, wherein the oil droplet is between 200 μm and 300 μm in size.
86. The microfluidic channel composition of clause 80, any other suitable clause, or any combination of suitable clauses, wherein the oil droplet is between 300 μm and 400 μm in size.
87. The microfluidic channel composition of clause 80, any other suitable clause, or any combination of suitable clauses, wherein the oil droplet is between 400 μm and 500 μm in size.
88. The microfluidic channel composition of clause 80, any other suitable clause, or any combination of suitable clauses, wherein the oil droplet is between 500 μm and 1000 μm in size.
89. The microfluidic channel composition of clause 80, any other suitable clause, or any combination of suitable clauses, wherein the oil droplet comprises an oleophilic angle.
90. The microfluidic channel composition of clause 80, any other suitable clause, or any combination of suitable clauses, wherein the oil droplet is a single droplet.
91. The microfluidic channel composition of clause 80, any other suitable clause, or any combination of suitable clauses, wherein the oil droplet is immobilized in the microfluidic channel composition.
92. The microfluidic channel composition of clause 80, any other suitable clause, or any combination of suitable clauses, wherein the oil droplet is stationary in the microfluidic channel composition.
93. The microfluidic channel composition of clause 80, any other suitable clause, or any combination of suitable clauses, wherein the oil droplet is configured in the microfluidic channel composition to allow a liquid composition to flow past the oil droplet.
94. The microfluidic channel composition of clause 93, any other suitable clause, or any combination of suitable clauses, wherein the flow is in the microfluidic channel.
95. The microfluidic channel composition of clause 93, any other suitable clause, or any combination of suitable clauses, wherein the flow is a continuous flow.
96. The microfluidic channel composition of clause 93, any other suitable clause, or any combination of suitable clauses, wherein the liquid composition is blood.
97. The microfluidic channel composition of clause 93, any other suitable clause, or any combination of suitable clauses, wherein the liquid composition is blood plasma.
98. The microfluidic channel composition of clause 93, any other suitable clause, or any combination of suitable clauses, wherein the liquid composition is a solution.
99. The microfluidic channel composition of clause 98, any other suitable clause, or any combination of suitable clauses, wherein the solution is a bacterial-containing solution.
100. The microfluidic channel composition of clause 98, any other suitable clause, or any combination of suitable clauses, wherein the solution is a viral-containing solution.
101. The microfluidic channel composition of clause 98, any other suitable clause, or any combination of suitable clauses, wherein the solution is a microorganism-containing solution.
102. The microfluidic channel composition of clause 98, any other suitable clause, or any combination of suitable clauses, wherein the solution is an antibody-containing solution.

103. The microfluidic channel composition of clause 98, any other suitable clause, or any combination of suitable clauses, wherein the solution is a particle-containing solution.

104. The microfluidic channel composition of clause 93, any other suitable clause, or any combination of suitable clauses, wherein the liquid composition is a suspension.

105. The microfluidic channel composition of clause 104, any other suitable clause, or any combination of suitable clauses, wherein the suspension is a bacterial-containing suspension.

106. The microfluidic channel composition of clause 104, any other suitable clause, or any combination of suitable clauses, wherein the solution is a viral-containing suspension.

107. The microfluidic channel composition of clause 104, any other suitable clause, or any combination of suitable clauses, wherein the solution is a microorganism-containing suspension.

108. The microfluidic channel composition of clause 104, any other suitable clause, or any combination of suitable clauses, wherein the suspension is an antibody-containing suspension.

109. The microfluidic channel composition of clause 104, any other suitable clause, or any combination of suitable clauses, wherein the suspension is a particle-containing suspension.

110. The microfluidic channel composition of clause 80, any other suitable clause, or any combination of suitable clauses, wherein the oil droplet is configured in the microfluidic channel composition to allow a liquid composition to interact with the oil droplet.

111. The microfluidic channel composition of clause 110, any other suitable clause, or any combination of suitable clauses, wherein the liquid composition is blood.

112. The microfluidic channel composition of clause 110, any other suitable clause, or any combination of suitable clauses, wherein the liquid composition is blood plasma.

113. The microfluidic channel composition of clause 110, any other suitable clause, or any combination of suitable clauses, wherein the liquid composition is a solution.

114. The microfluidic channel composition of clause 113, any other suitable clause, or any combination of suitable clauses, wherein the solution is a bacterial-containing solution.

115. The microfluidic channel composition of clause 113, any other suitable clause, or any combination of suitable clauses, wherein the solution is a viral-containing solution.

116. The microfluidic channel composition of clause 113, any other suitable clause, or any combination of suitable clauses, wherein the solution is a microorganism-containing solution.

117. The microfluidic channel composition of clause 113, any other suitable clause, or any combination of suitable clauses, wherein the solution is an antibody-containing solution.

118. The microfluidic channel composition of clause 113, any other suitable clause, or any combination of suitable clauses, wherein the solution is a particle-containing solution.

119. The microfluidic channel composition of clause 110, any other suitable clause, or any combination of suitable clauses, wherein the liquid composition is a suspension.

120. The microfluidic channel composition of clause 119, any other suitable clause, or any combination of suitable clauses, wherein the suspension is a bacterial-containing suspension.

121. The microfluidic channel composition of clause 119, any other suitable clause, or any combination of suitable clauses, wherein the solution is a viral-containing suspension.

122. The microfluidic channel composition of clause 119, any other suitable clause, or any combination of suitable clauses, wherein the solution is a microorganism-containing suspension.

123. The microfluidic channel composition of clause 119, any other suitable clause, or any combination of suitable clauses, wherein the suspension is an antibody-containing suspension.

124. The microfluidic channel composition of clause 119, any other suitable clause, or any combination of suitable clauses, wherein the suspension is a particle-containing suspension.

125. A microfluidic platform comprising a microfluidic channel composition configured for establishing a liquid-liquid interface, wherein the microfluidic channel composition comprises a polymer.

126. The microfluidic platform of clause 125, any other suitable clause, or any combination of suitable clauses, wherein the microfluidic platform comprises a reservoir.

127. The microfluidic platform of clause 126, any other suitable clause, or any combination of suitable clauses, wherein the reservoir comprises a liquid composition.

128. The microfluidic platform of clause 127, any other suitable clause, or any combination of suitable clauses, wherein the liquid composition is blood.

129. The microfluidic platform of clause 127, any other suitable clause, or any combination of suitable clauses, wherein the liquid composition is blood plasma.

130. The microfluidic platform of clause 127, any other suitable clause, or any combination of suitable clauses, wherein the liquid composition is a solution.

131. The microfluidic platform of clause 130, any other suitable clause, or any combination of suitable clauses, wherein the solution is a bacterial-containing solution.

132. The microfluidic platform of clause 130, any other suitable clause, or any combination of suitable clauses, wherein the solution is a viral-containing solution.

133. The microfluidic platform of clause 130, any other suitable clause, or any combination of suitable clauses, wherein the solution is a microorganism-containing solution.

134. The microfluidic platform of clause 130, any other suitable clause, or any combination of suitable clauses, wherein the solution is an antibody-containing solution.

135. The microfluidic platform of clause 130, any other suitable clause, or any combination of suitable clauses, wherein the solution is a particle-containing solution.

136. The microfluidic platform of clause 127, any other suitable clause, or any combination of suitable clauses, wherein the liquid composition is a suspension.

137. The microfluidic platform of clause 136, any other suitable clause, or any combination of suitable clauses, wherein the suspension is a bacterial-containing suspension.

138. The microfluidic platform of clause 136, any other suitable clause, or any combination of suitable clauses, wherein the solution is a viral-containing suspension.
139. The microfluidic platform of clause 136, any other suitable clause, or any combination of suitable clauses, wherein the solution is a microorganism-containing suspension.
140. The microfluidic platform of clause 136, any other suitable clause, or any combination of suitable clauses, wherein the suspension is an antibody-containing suspension.
141. The microfluidic platform of clause 127, any other suitable clause, or any combination of suitable clauses, wherein the suspension is a particle-containing suspension.
142. The microfluidic platform of clause 127, any other suitable clause, or any combination of suitable clauses, wherein the solution is a bacterial-containing solution.
143. The microfluidic platform of clause 127, any other suitable clause, or any combination of suitable clauses, wherein the solution is a viral-containing solution.
144. The microfluidic platform of clause 127, any other suitable clause, or any combination of suitable clauses, wherein the solution is a microorganism-containing solution.
145. The microfluidic platform of clause 126, any other suitable clause, or any combination of suitable clauses, wherein the reservoir comprises a culture.
146. The microfluidic platform of clause 145, any other suitable clause, or any combination of suitable clauses, wherein the culture is a bacterial culture.
147. The microfluidic platform of clause 126, any other suitable clause, or any combination of suitable clauses, wherein the reservoir is connected to a chemostate.
148. The microfluidic platform of clause 125, any other suitable clause, or any combination of suitable clauses, wherein the microfluidic platform comprises a first pump.
149. The microfluidic platform of clause 148, any other suitable clause, or any combination of suitable clauses, wherein the first pump is configured to withdraw a liquid composition from the reservoir.
150. The microfluidic platform of clause 149, any other suitable clause, or any combination of suitable clauses, wherein the liquid composition is selected from the group consisting of a solution, a suspension, a culture, or any combination thereof.
151. The microfluidic platform of clause 125, any other suitable clause, or any combination of suitable clauses, wherein the microfluidic platform comprises one or more pieces of tubing.
152. The microfluidic platform of clause 151, any other suitable clause, or any combination of suitable clauses, wherein the tubing connects the microfluidic channel composition to the reservoir.
153. The microfluidic platform of clause 151, any other suitable clause, or any combination of suitable clauses, wherein the tubing connects the reservoir to the first pump.
154. The microfluidic platform of clause 151, any other suitable clause, or any combination of suitable clauses, wherein the tubing connects the first pump to the microfluidic channel composition.
155. The microfluidic platform of clause 125, any other suitable clause, or any combination of suitable clauses, wherein the microfluidic platform comprises a culture loop.
156. The microfluidic platform of clause 155, any other suitable clause, or any combination of suitable clauses, wherein the culture loop is configured between the reservoir and the first pump.
157. The microfluidic platform of clause 155, any other suitable clause, or any combination of suitable clauses, wherein the culture loop comprises a second pump.
158. The microfluidic platform of clause 155, any other suitable clause, or any combination of suitable clauses, wherein the culture loop comprises an access valve.
159. The microfluidic platform of clause 155, any other suitable clause, or any combination of suitable clauses, wherein the culture loop comprises one or more pieces of tubing.
160. The microfluidic platform of clause 159, any other suitable clause, or any combination of suitable clauses, wherein the tubing connects the reservoir to the second pump.
161. The microfluidic platform of clause 125, any other suitable clause, or any combination of suitable clauses, wherein the microfluidic platform comprises an instrument for analysis.
162. The microfluidic platform of clause 161, any other suitable clause, or any combination of suitable clauses, wherein the instrument is selected from the group consisting of a microscope, an interferometer, an infrared spectroscopy (FTIR), a quartz crystal microbalance (QCM), and any combination thereof.
163. The microfluidic platform of clause 161, any other suitable clause, or any combination of suitable clauses, wherein the instrument is selected from the group consisting of a digital holographic interferometer, an epi-fluorescence microscope, a mass spectrometer, a micro particle image velocimeter, a micro-rheometer, a raman spectrometer, and an atomic force microscope.
164. The microfluidic platform of clause 161, any other suitable clause, or any combination of suitable clauses, wherein the instrument is a microscope.
165. The microfluidic platform of clause 161, any other suitable clause, or any combination of suitable clauses, wherein the instrument is an interferometer.
166. The microfluidic platform of clause 161, any other suitable clause, or any combination of suitable clauses, wherein the instrument is an infrared spectroscopy (FTIR).
167. The microfluidic platform of clause 161, any other suitable clause, or any combination of suitable clauses, wherein the instrument is a quartz crystal microbalance (QCM).
168. The microfluidic platform of clause 161, any other suitable clause, or any combination of suitable clauses, wherein the instrument comprises a functionality selected from the group consisting of phase contrast, fluorescence, time lapse imaging, high speed imaging, and any combination thereof.
169. The microfluidic platform of clause 125, any other suitable clause, or any combination of suitable clauses, wherein the microfluidic platform comprises a buffer pump configured to input a buffer to the microfluidic channel composition.
170. The microfluidic platform of clause 169, any other suitable clause, or any combination of suitable clauses, wherein the buffer comprises water.
171. The microfluidic platform of clause 169, any other suitable clause, or any combination of suitable clauses, wherein the buffer comprises a saline-containing buffer.

172. The microfluidic platform of clause 169, any other suitable clause, or any combination of suitable clauses, wherein the buffer enters a fluid port of the microfluidic channel composition configured for input of the buffer.
173. The microfluidic platform of clause 125, any other suitable clause, or any combination of suitable clauses, wherein the microfluidic platform comprises an oil pump configured to input an oil to the microfluidic channel composition.
174. The microfluidic platform of clause 173, any other suitable clause, or any combination of suitable clauses, wherein the oil enters a fluid port of the microfluidic channel composition configured for input of the oil.
175. The microfluidic platform of clause 125, any other suitable clause, or any combination of suitable clauses, wherein the microfluidic platform comprises an oil droplet.
176. The microfluidic platform of clause 175, any other suitable clause, or any combination of suitable clauses, wherein the microfluidic platform is configured to obtain a high spatial observation of the oil droplet.
177. The microfluidic platform of clause 175, any other suitable clause, or any combination of suitable clauses, wherein the microfluidic platform is configured to obtain a long-term temporal observation of the oil droplet.
178. The microfluidic platform of clause 125, any other suitable clause, or any combination of suitable clauses, wherein the microfluidic platform further comprises a chemostat.
179. The microfluidic platform of clause 125, any other suitable clause, or any combination of suitable clauses, wherein the microfluidic platform further comprises a temperature control.
180. The microfluidic platform of clause 125, any other suitable clause, or any combination of suitable clauses, wherein the microfluidic platform further comprises an oil surface functionalization.
181. The microfluidic platform of clause 180, any other suitable clause, or any combination of suitable clauses, wherein the oil surface functionalization is a lipid.
182. The microfluidic platform of clause 125, any other suitable clause, or any combination of suitable clauses, wherein the microfluidic platform further comprises a channel functionalization.
183. The microfluidic platform of clause 125, any other suitable clause, or any combination of suitable clauses, wherein the microfluidic platform further comprises a pressure sensor.
184. The microfluidic platform of clause 125, any other suitable clause, or any combination of suitable clauses, wherein the microfluidic platform further comprises a chemical sensor.
185. A method of analyzing an oil droplet, said method comprising the steps of
immobilizing the oil droplet in the microfluidic platform of any one of clauses 125 to 184, and
interacting a liquid composition comprising bacteria with the oil droplet.
186. The method of clause 185, any other suitable clause, or any combination of suitable clauses, wherein the analysis is a direct analysis.
187. The method of clause 185, any other suitable clause, or any combination of suitable clauses, wherein the analysis is for a duration of 30 minutes to 12 hours.
188. The method of clause 185, any other suitable clause, or any combination of suitable clauses, wherein the analysis is for a duration of about 12 hours.
189. The method of clause 185, any other suitable clause, or any combination of suitable clauses, wherein the analysis is for a duration of about 1 day.
190. The method of clause 185, any other suitable clause, or any combination of suitable clauses, wherein the analysis is for a duration between 1 day and 7 days.
191. The method of clause 185, any other suitable clause, or any combination of suitable clauses, wherein the analysis is for a duration between 1 day and 14 days.
192. The method of clause 185, any other suitable clause, or any combination of suitable clauses, wherein the analysis is for a duration between 1 day and 21 days.
193. The method of clause 185, any other suitable clause, or any combination of suitable clauses, wherein the analysis is for a duration between 1 day and 28 days.
194. The method of clause 185, any other suitable clause, or any combination of suitable clauses, wherein the analysis is for a duration between 7 days and 14 days.
195. The method of clause 185, any other suitable clause, or any combination of suitable clauses, wherein the analysis is for a duration between 14 days and 21 days.
196. The method of clause 185, any other suitable clause, or any combination of suitable clauses, wherein the analysis is for a duration between 21 days and 28 days.
197. The method of clause 185, any other suitable clause, or any combination of suitable clauses, wherein the analysis is for a duration of about 1 month.
198. The method of clause 185, any other suitable clause, or any combination of suitable clauses, wherein the analysis is for a duration of about 2 months.
199. The method of clause 185, any other suitable clause, or any combination of suitable clauses, wherein the analysis is for a duration of about 3 months.
200. The method of clause 185, any other suitable clause, or any combination of suitable clauses, wherein the analysis is for a duration of about 4 months.
201. The method of clause 185, any other suitable clause, or any combination of suitable clauses, wherein the analysis evaluates an environmental setting.
202. The method of clause 201, any other suitable clause, or any combination of suitable clauses, wherein the environmental setting is an oil spill.
203. The method of clause 201, any other suitable clause, or any combination of suitable clauses, wherein the environmental setting is an oil exploration setting.
204. The method of clause 201, any other suitable clause, or any combination of suitable clauses, wherein the environmental setting is an oil refining setting.
205. The method of clause 201, any other suitable clause, or any combination of suitable clauses, wherein the environmental setting is an oil spill remediation setting.
206. A method of analyzing a chemical or biological process, said method comprising the steps of
immobilizing an oil droplet in the microfluidic platform of any of clauses 125 to 184 and
interacting a liquid composition with the oil droplet.
207. The method of clause 206, any other suitable clause, or any combination of suitable clauses, wherein the chemical or biological process is particle adsorption.
208. The method of clause 206, any other suitable clause, or any combination of suitable clauses, wherein the chemical or biological process is particle desorption.

209. The method of clause 206, any other suitable clause, or any combination of suitable clauses, wherein the chemical or biological process is nanomaterial accumulation.
210. The method of clause 206, any other suitable clause, or any combination of suitable clauses, wherein the chemical or biological process is biofilm formation.
211. The method of clause 206, any other suitable clause, or any combination of suitable clauses, wherein the chemical or biological process is a biodegradation process of oil by a microbe.
212. The method of clause 206, any other suitable clause, or any combination of suitable clauses, wherein the chemical or biological process is toxicity of a dispersant on an environmental setting.
213. The method of clause 206, any other suitable clause, or any combination of suitable clauses, wherein the analysis is a direct analysis.
214. The method of clause 206, any other suitable clause, or any combination of suitable clauses, wherein the analysis is for a duration between 1 day and 7 days.
215. The method of clause 206, any other suitable clause, or any combination of suitable clauses, wherein the analysis is for a duration between 1 day and 14 days.
216. The method of clause 206, any other suitable clause, or any combination of suitable clauses, wherein the analysis is for a duration between 1 day and 21 days.
217. The method of clause 206, any other suitable clause, or any combination of suitable clauses, wherein the analysis is for a duration between 1 day and 28 days.
218. The method of clause 206, any other suitable clause, or any combination of suitable clauses, wherein the analysis is for a duration between 7 days and 14 days.
219. The method of clause 206, any other suitable clause, or any combination of suitable clauses, wherein the analysis is for a duration between 14 days and 21 days.
220. The method of clause 206, any other suitable clause, or any combination of suitable clauses, wherein the analysis is for a duration between 21 days and 28 days.
221. The method of clause 206, any other suitable clause, or any combination of suitable clauses, wherein the analysis is for a duration of about 1 month.
222. The method of clause 206, any other suitable clause, or any combination of suitable clauses, wherein the analysis is for a duration of about 2 months.
223. The method of clause 206, any other suitable clause, or any combination of suitable clauses, wherein the analysis is for a duration of about 3 months.
224. A method of fabricating a microfluidic channel composition configured for establishing a liquid-liquid interface, wherein the microfluidic channel composition is the microfluidic channel composition of any one of clauses 1 to 124.

In an illustrative aspect, a microfluidic channel composition is provided. The microfluidic channel composition is configured for presentation of a liquid-liquid interface, wherein the microfluidic channel composition comprises a polymer.

In an embodiment, the liquid-liquid interface is an oil-aqueous interface. In an embodiment, the polymer is a transparent co-polymer. In an embodiment, the transparent copolymer is selected from the group consisting of poly (dimethylsiloxane) (PDMS), poly(methyl methacrylate) (PMMA), ethylene-vinyl acetate, and nylon.

In an embodiment, the polymer is a thermoplastic. In an embodiment, the thermoplastic is polytetrafluoroethylene (PTFE). In an embodiment, the thermoplastic is an acrylic.

In an embodiment, it is contemplated that hydrogel and/or gelatin can be combined with a polymer or used instead of a polymer.

In an embodiment, the polymer is a thiol-ene polymer system. In an embodiment, the polymer is a thiol-yne polymer system. In an embodiment, the polymer is a polyurethane. In an embodiment, the polymer is PDMS.

In an embodiment, the polymer is bonded to glass. In an embodiment, the glass is a glass slide. In an embodiment, the glass slide is a glass microscope slide. In an embodiment, the polymer is bonded to the glass via air plasma.

In an embodiment, the microfluidic channel composition comprises at least two inner walls. In an embodiment, the two inner walls are configured to form a channel in the microfluidic channel composition. In an embodiment, at least one wall is hydrophilic. In an embodiment, at least one wall is hydrophobic. In an embodiment, the two inner walls are hydrophilic. In an embodiment, the two inner walls are hydrophobic. In an embodiment, at least one wall is negatively charged. In an embodiment, at least one wall is positively charged. In an embodiment, the two inner walls are negatively charged. In an embodiment, the two inner walls are positively charged.

In an embodiment, at least one wall comprises poly (allylamine hydrochloride) (PAH). In an embodiment, the wall comprising PAH is positively charged.

In an embodiment, at least one wall comprises poly (sodium 4-styrenesulfonate) (PSS). In an embodiment, the wall comprising PSS is negatively charged.

In an embodiment, at least one wall comprises PAH and PSS. In an embodiment, the PAH and the PSS are configured in layers on the wall. In an embodiment, the PAH and the PSS are configured in alternating layers on the wall. In an embodiment, the wall is negatively charged. In an embodiment, the wall is positively charged. In an embodiment, the wall is hydrophilic. In an embodiment, the wall is hydrophobic.

In an embodiment, the microfluidic channel composition comprises one or more fluid ports. In an embodiment, the microfluidic channel composition comprises two or more fluid ports. In an embodiment, the microfluidic channel composition comprises three or more fluid ports. In an embodiment, the microfluidic channel composition comprises four or more fluid ports. In an embodiment, the fluid ports are selected from the group consisting of i) an inlet configured for input of a solution or suspension, ii) an outlet configured for output of a solution or suspension, iii) an input configured for input of a buffer, and iv) an input configured for input of an oil.

In an embodiment, the microfluidic channel composition comprises four fluid ports. In an embodiment, a first fluid port is an inlet configured for input of a liquid composition. In an embodiment, the liquid composition is blood. In an embodiment, the liquid composition is blood plasma. In an embodiment, the liquid composition is a solution. In an embodiment, the solution is a bacterial-containing solution. In an embodiment, the solution is a viral-containing solution. In an embodiment, the solution is a microorganism-containing solution. In an embodiment, the solution is an antibody-containing solution. In an embodiment, the solution is a particle-containing solution.

In an embodiment, the liquid composition is a suspension. In an embodiment, the suspension is a bacterial-containing suspension. In an embodiment, the solution is a viral-containing suspension. In an embodiment, the solution is a microorganism-containing suspension. In an embodiment, the suspension is an antibody-containing suspension. In an embodiment, the suspension is a particle-containing suspension.

In an embodiment, a second fluid port is an outlet configured for output of a liquid composition. In an embodiment, the liquid composition is blood. In an embodiment, the liquid composition is blood plasma. In an embodiment, the liquid composition is a solution. In an embodiment, the solution is a bacterial-containing solution. In an embodiment, the solution is a viral-containing solution. In an embodiment, the solution is a microorganism-containing solution. In an embodiment, the solution is an antibody-containing solution. In an embodiment, the solution is a particle-containing solution.

In an embodiment, the liquid composition is a suspension. In an embodiment, the suspension is a bacterial-containing suspension. In an embodiment, the solution is a viral-containing suspension. In an embodiment, the solution is a microorganism-containing suspension. In an embodiment, the suspension is an antibody-containing suspension. In an embodiment, the suspension is a particle-containing suspension.

In an embodiment, a third fluid port is an input configured for input of a buffer. In an embodiment, the buffer is water. In an embodiment, the buffer is a saline-containing buffer.

In an embodiment, a fourth fluid port is an input configured for input of an oil. In an embodiment, the microfluidic channel composition comprises a coaxial nozzle. In an embodiment, the coaxial nozzle is capable of immobilization of an oil droplet in the microfluidic channel composition. In an embodiment, the coaxial nozzle comprises a flow-focusing junction.

In an embodiment, the microfluidic channel composition comprises an oil droplet. In an embodiment, the oil droplet is circular. In an embodiment, the oil droplet is between 1 μm and 1000 μm in size. In an embodiment, the oil droplet is between 1 μm and 100 μm in size. In an embodiment, the oil droplet is between 100 μm and 200 μm in size. In an embodiment, the oil droplet is between 200 μm and 300 μm in size. In an embodiment, the oil droplet is between 300 μm and 400 μm in size. In an embodiment, the oil droplet is between 400 μm and 500 μm in size. In an embodiment, the oil droplet is between 500 μm and 1000 μm in size. In an embodiment, the oil droplet comprises an oleophilic angle.

In an embodiment, the oil droplet is a single droplet. In an embodiment, the oil droplet is immobilized in the microfluidic channel composition. In an embodiment, the oil droplet is stationary in the microfluidic channel composition.

In an embodiment, the oil droplet is configured in the microfluidic channel composition to allow a liquid composition to flow past the oil droplet. In an embodiment, the flow is in the microfluidic channel. In an embodiment, the flow is a continuous flow. In an embodiment, the liquid composition is blood. In an embodiment, the liquid composition is blood plasma. In an embodiment, the liquid composition is a solution. In an embodiment, the solution is a bacterial-containing solution. In an embodiment, the solution is a viral-containing solution. In an embodiment, the solution is a microorganism-containing solution. In an embodiment, the solution is an antibody-containing solution. In an embodiment, the solution is a particle-containing solution.

In an embodiment, the liquid composition is a suspension. In an embodiment, the suspension is a bacterial-containing suspension. In an embodiment, the solution is a viral-containing suspension. In an embodiment, the solution is a microorganism-containing suspension. In an embodiment, the suspension is an antibody-containing suspension. In an embodiment, the suspension is a particle-containing suspension.

In an embodiment, the oil droplet is configured in the microfluidic channel composition to allow a liquid composition to interact with the oil droplet. In an embodiment, the liquid composition is blood. In an embodiment, the liquid composition is blood plasma. In an embodiment, the liquid composition is a solution. In an embodiment, the solution is a bacterial-containing solution. In an embodiment, the solution is a viral-containing solution. In an embodiment, the solution is a microorganism-containing solution. In an embodiment, the solution is an antibody-containing solution. In an embodiment, the solution is a particle-containing solution.

In an embodiment, the liquid composition is a suspension. In an embodiment, the suspension is a bacterial-containing suspension. In an embodiment, the solution is a viral-containing suspension. In an embodiment, the solution is a microorganism-containing suspension. In an embodiment, the suspension is an antibody-containing suspension. In an embodiment, the suspension is a particle-containing suspension.

In an illustrative aspect, a microfluidic platform comprising the microfluidic channel composition is provided. The previously described embodiments of the microfluidic channel composition are applicable to the microfluidic platform described herein.

In an embodiment, the microfluidic platform comprises a reservoir. In an embodiment, the reservoir comprises a liquid composition. In an embodiment, the liquid composition is blood. In an embodiment, the liquid composition is blood plasma.

In an embodiment, the liquid composition is a solution. In an embodiment, the solution is a bacterial-containing solution. In an embodiment, the solution is a viral-containing solution. In an embodiment, the solution is a microorganism-containing solution. In an embodiment, the solution is an antibody-containing solution. In an embodiment, the solution is a particle-containing solution.

In an embodiment, the liquid composition is a suspension. In an embodiment, the suspension is a bacterial-containing suspension. In an embodiment, the solution is a viral-containing suspension. In an embodiment, the solution is a microorganism-containing suspension. In an embodiment, the suspension is an antibody-containing suspension. In an embodiment, the suspension is a particle-containing suspension. In an embodiment, the solution is a bacterial-containing solution. In an embodiment, the solution is a viral-containing solution. In an embodiment, the solution is a microorganism-containing solution.

In an embodiment, the reservoir comprises a culture. In an embodiment, the culture is a bacterial culture. In an embodiment, the reservoir is connected to a chemostate.

In an embodiment, the microfluidic platform comprises a first pump. In an embodiment, the first pump is configured to withdraw a liquid composition from the reservoir. In an embodiment, the liquid composition is selected from the group consisting of a solution, a suspension, a culture, or any combination thereof.

In an embodiment, the microfluidic platform comprises one or more pieces of tubing. In an embodiment, the tubing connects the microfluidic channel composition to the reservoir. In an embodiment, the tubing connects the reservoir to the first pump. In an embodiment, the tubing connects the first pump to the microfluidic channel composition.

In an embodiment, the microfluidic platform comprises a culture loop. In an embodiment, the culture loop is configured between the reservoir and the first pump. In an embodiment, the culture loop comprises a second pump. In an embodiment, the culture loop comprises an access valve. In an embodiment, the culture loop comprises one or more pieces of tubing. In an embodiment, the tubing connects the reservoir to the second pump.

In an embodiment, the microfluidic platform comprises an instrument for analysis. In an embodiment, the instrument is selected from the group consisting of a microscope, an interferometer, an infrared spectroscopy (FTIR), a quartz crystal microbalance (QCM), and any combination thereof. In an embodiment, the instrument is selected from the group consisting of a digital holographic interferometer, an epi-fluorescence microscope, a mass spectrometer, a micro particle image velocimeter, a micro-rheometer, a raman spectrometer, and an atomic force microscope. In an embodiment, the instrument is a microscope. In an embodiment, the instrument is an interferometer. In an embodiment, the instrument is an infrared spectroscopy (FTIR). In an embodiment, the instrument is a quartz crystal microbalance (QCM). In an embodiment, the instrument comprises a functionality selected from the group consisting of phase contrast, fluorescence, time lapse imaging, high speed imaging, and any combination thereof.

In an embodiment, the microfluidic platform comprises a buffer pump configured to input a buffer to the microfluidic channel composition. In an embodiment, the buffer comprises water. In an embodiment, the buffer comprises a saline-containing buffer. In an embodiment, the buffer enters a fluid port of the microfluidic channel composition configured for input of the buffer.

In an embodiment, the microfluidic platform comprises an oil pump configured to input an oil to the microfluidic channel composition. In an embodiment, the oil enters a fluid port of the microfluidic channel composition configured for input of the oil.

In an embodiment, the microfluidic platform comprises an oil droplet. In an embodiment, the microfluidic platform is configured to obtain a high spatial observation of the oil droplet. In an embodiment, the microfluidic platform is configured to obtain a long-term temporal observation of the oil droplet.

In an embodiment, the microfluidic platform further comprises a chemostat. In an embodiment, the microfluidic platform further comprises a temperature control. In an embodiment, the microfluidic platform further comprises an oil surface functionalization. In an embodiment, the oil surface functionalization is a lipid. In an embodiment, the microfluidic platform further comprises a channel functionalization. In an embodiment, the microfluidic platform further comprises a pressure sensor. In an embodiment, the microfluidic platform further comprises a chemical sensor.

In an illustrative aspect, a method of analyzing an oil droplet is provided. The method comprises the steps of immobilizing the oil droplet in the microfluidic platform and interacting a liquid composition comprising bacteria with the oil droplet. The previously described embodiments of the microfluidic channel composition and of the microfluidic platform are applicable to the methods described herein.

In an embodiment, the analysis is a direct analysis. In an embodiment, the analysis is for a duration of 30 minutes to 12 hours. In an embodiment, the analysis is for a duration of about 12 hours. In an embodiment, the analysis is for a duration of about 1 day. In an embodiment, the analysis is for a duration between 1 day and 7 days. In an embodiment, the analysis is for a duration between 1 day and 14 days. In an embodiment, the analysis is for a duration between 1 day and 21 days. In an embodiment, the analysis is for a duration between 1 day and 28 days. In an embodiment, the analysis is for a duration between 7 days and 14 days. In an embodiment, the analysis is for a duration between 14 days and 21 days. In an embodiment, the analysis is for a duration between 21 days and 28 days. In an embodiment, the analysis is for a duration of about 1 month. In an embodiment, the analysis is for a duration of about 2 months. In an embodiment, the analysis is for a duration of about 3 months. In an embodiment, the analysis is for a duration of about 4 months.

In an embodiment, the analysis evaluates an environmental setting. In an embodiment, the environmental setting is an oil spill. In an embodiment, the environmental setting is an oil exploration setting. In an embodiment, the environmental setting is an oil refining setting. In an embodiment, the environmental setting is an oil spill remediation setting.

In an illustrative aspect, a method of analyzing a chemical or biological process is provided. The method comprises the steps of immobilizing an oil droplet in the microfluidic platform and interacting a liquid composition with the oil droplet. The previously described embodiments of the microfluidic channel composition and of the microfluidic platform are applicable to the methods described herein.

In an embodiment, the chemical or biological process is particle adsorption. In an embodiment, the chemical or biological process is particle desorption. In an embodiment, the chemical or biological process is nanomaterial accumulation. In an embodiment, the chemical or biological process is biofilm formation. In an embodiment, the chemical or biological process is a biodegradation process of oil by a microbe. In an embodiment, the chemical or biological process is toxicity of a dispersant on an environmental setting. In an embodiment, the analysis is a direct analysis. In an embodiment, the analysis is for a duration between 1 day and 7 days. In an embodiment, the analysis is for a duration between 1 day and 14 days. In an embodiment, the analysis is for a duration between 1 day and 21 days. In an embodiment, the analysis is for a duration between 1 day and 28 days. In an embodiment, the analysis is for a duration between 7 days and 14 days. In an embodiment, the analysis is for a duration between 14 days and 21 days. In an embodiment, the analysis is for a duration between 21 days and 28 days. In an embodiment, the analysis is for a duration of about 1 month. In an embodiment, the analysis is for a duration of about 2 months. In an embodiment, the analysis is for a duration of about 3 months.

In an illustrative aspect, a method of fabricating a microfluidic channel composition configured for establishing a liquid-liquid interface, wherein the microfluidic channel composition comprises a polymer, is provided. The previously described embodiments of the microfluidic channel composition and of the microfluidic platform are applicable to the methods described herein.

EXAMPLES

Example 1

Fabrication of Microfluidic Channel Composition and Microfluidic Platform

The instant example provides an exemplary microfluidic channel composition and an exemplary microfluidic platform according to the present disclosure.

Figure 2:
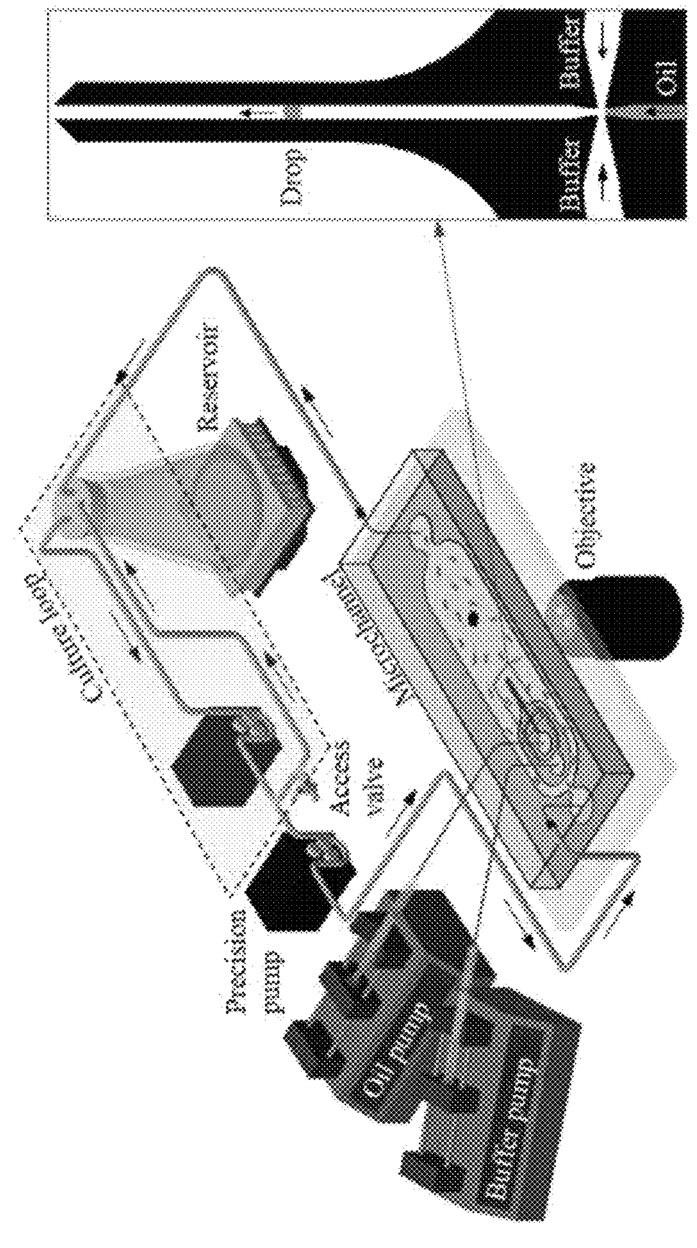

Fluidics circuit. The fluidic circuit comprises a 125 ml flask reservoir, a 12V 50 rpm peristaltic pump (INTLLAB), a micro-peristaltic pump (marked as "precision pump" in FIG. 2. Masterflex C/L, Cole-Parmer), and a microfluidic channel. These components are connected using tubing, e.g. soft ¼" OD, 3⁄16" ID Tygon tubing (Cole-Parmer) with 1⁄16" OD PEEK tubing (IDEX) used to connect to microfluidic channel. PEEK fittings (IDEX) connect the PEEK tubing to polypropylene barbed fittings (Cole-Parmer) connected to the Tygon tubing. Two flow loops can be constructed as shown in FIG. 2; one "culturing loop" which bypasses the microchannel, and the observation loop which does flow through the channel. A polycarbonate stopcock is connected to the "culturing loop" to provide access to the fluidic circuit for either inoculation or sampling. A chemostat can also be integrated into the circuit to control microbe concentrations in the microfluidic platform in conjunction with the reservoir.

Microfluidic channel and fabrication. The microfluidic channel is symmetric with the height of 100 μm, the length of 60 mm, and the width of 11 mm. There are four fluid ports with the diameter of 1.5 mm: two primary ports for circulating the bacterial suspension through the microchannel during microcosm experiments, and two auxiliary ports, i.e. one for the oil inlet, and one for the aqueous buffer inlet used for generating a single oil droplet. PEEK tubing (OD=1⁄16") interfaces directly with the ports. A co-axial nozzle with flow-focusing junction (Inset in FIG. 2) generates a single oil droplet. The nozzle has a width of 100 μm and the narrowest cross-section of the junction is 50 μm. The dispensing procedure is detailed below.

The microfluidic channel can be made of poly(dimethylsiloxane) (PDMS, Dow Corning) and fabricated using conventional soft lithography. A hard chrome mask of the 2D channel layout can be made using a mask writer (Heidelburg). On a 4 inch silicon wafer, a 100 μm thick layer of SU-8 negative photoresist (SU-82075. MicroChem) is spincoated at 2200 rpm for 30 s, soft baked on a hotplate at 65 C for 5 min, and then hard baked at 95 C for 20 min. The wafer is then patterned using a mask aligner (Carl Suss) for 30 s with hard contact mode. A post-exposure bake at 65 C for 5 min and followed by 95 C for 10 min. The master is developed in 1-methoxy-2-propanol acetate (Fisher) for 17 min at room temperature to reveal the channel features. The baking protocols should be followed to prevent thermal induced cracks often developed at feature with sharp corner such as flow focusing junction and nozzle tips.

PDMS is mixed at a ratio of 10:1 (PDMS: cross-linking agent) and degassed in a desiccator. The mixture is poured onto the master and cured in an oven at 65° C. for 2 days. After curing, the PDMS channel is cut and released from the master, as well as fluid ports are produced using a 1.5 mm biopsy punch. A 1"×3" microscope slide is cleaned with "piranha" etching solution (98% $H_2SO_4$ and 30% $H_2O_2$ at a ratio of 1:2 v/v) and bonded with the PDMS channel by exposing to air plasma for 1.5 min in a plasma cleaner (Harrick). Immediately after bonding the hydrophilic layer-by-layer functionalization procedure follows.

Layer-by-layer hydrophilic polyelectrolyte coating. The PDMS-glass microchannel walls are functionalized to be hydrophilic with a layer-by-layer deposition technique. FIGS. 6A-6H provides a schematic representation of the functionalization process. Immediately after bonding the PDMS microchannel to the glass substrate with air plasma, the device is filled with a 0.5 M NaCl (Sigma-Aldrich) solution containing 10 μM poly(allylamine hydrochloride) (PAH. Alfa Aesar) with a molar mass of 120,000-200,000 g $mol^{-1}$. The PAH adsorbs to the negatively charged channel walls, producing a positively charged PAH layer. After 5 min, the PAH is removed and the channel is rinsed thoroughly with 0.1 M NaCl to remove any remaining unadsorbed PAH. The device is then filled with a 0.5 M NaCl solution containing 10 μM poly(sodium 4-styrenesulfonate) (PSS. Sigma-Aldrich) with a molar mass of 1,000,000 g $mol^{-1}$. The PSS adsorbs to the positively charged PAH layer to form a negatively charged PSS layer. After 5 min, the PSS is removed and the channel is rinsed thoroughly with 0.1 M NaCl solution to remove any unadsorbed PSS. The washing step is crucial due to the tendency of PSS and PAH to form precipitates. This process is continued with alternating PAH/PSS deposition with NaCl washes in between until multiple PAH-PSS layers (e.g. 4 layers are used in experiments) are formed with PSS as the final layer. The channel is then rinsed thoroughly with DI water (Millipore Milli-DI) and dried in a desiccator. The functionalization can remain effective after exposure to severe flow shear for several weeks. The shelf-life of the functionalized surface lasts at least 5 months when stored in vacuum.

Dispensing and pinning single droplet. The droplet is dispensed by manually controlling syringe pumps (New Era Pump Systems) for the oil and the aqueous buffer (FIG. 2). A glass syringe (Hamilton Gastight) is used for oil, while a 3 ml disposable syringe (BD) is used for buffer solution. With the "precision pump" (a Masterflex C/L peristaltic pump, Cole-Parmer) operating at a flow rate of 148 μl $min^{-1}$, the buffer solution is injected into microchannel at 50 μl $min^{-1}$ while the oil is infused at 100 nl $min^{-1}$. At this low flow rate, the oil slowly approaches the flow-focusing junction (FIG. 2 inset). As the oil enters the junction, the syringe pump for oil is turned off. The oil plug will neck with the aid of two side impinging flows and subsequently pinches off to form a single droplet. Once pinched off, the droplet is advected downstream along the nozzle. After exiting the nozzle into the 11 mm wide observation channel, the droplet is further carried downstream by the flow generated by the Masterflex pump. Once the droplet reaches the center of the observation area in the main channel, both syringe pump for buffer solution and Masterflex peristaltic pump for culturing fluids are turned off. The droplet will subsequently come to rest. Left in this state overnight, the droplet becomes pinned (or immobilized) to the top (PDMS) and bottom (glass) channel walls while preserving its oleophobic contact angle with the walls as well as its circular cross-section.

Sterilization. All materials are autoclaved at 121° C. for 30 min except for the polycarbonate stopcock ("access valve" in FIG. 1) and the microchannel. The stopcock is soaked in 70% ethyl alcohol for 30 min and left to dry in a laminar flow hood with UV light. The functionalized microchannel is filled with 70% ethyl alcohol for 30 min, drained, and left to dry in the laminar flow hood. Culture media used to fill the fluidics circuit prior to inoculation is autoclaved. The experimental components are assembled in the laminar hood and then carefully transferred to the microscope. Following dispensing and pinning of the droplet, the sterile culture medium is circulated through the entire fluidic circuit including both loops for at least 24 hr to verify sterile conditions. Sterilization procedures are followed before every experiment.

Culturing. In this example, bacteria used are *Alcanivorax borkumensis* (ATCC 700651). *Marinobacter hydrocarbonoclasticus* (ATCC 27132), and *Pseudomonas* sp. (ATCC 27259). The microbes are cultured according to a two-step growth protocol. First the bacteria are grown on a rotary shaker at 120 rpm and room temperature in ATCC-recommended growth media: Difco Marine Broth 2216 (BD) (37.4 g $L^{-1}$) with sodium pyruvate (Fisher) (10 g $L^{-1}$) for *Alcanivorax*. Difco Marine Broth 2216 (37.4 g $L^{-1}$) without sodium pyruvate for *Marinobacter*, Difco Nutrient Broth (BD) (8 g $L^{-1}$) for *Pseudomonas*. In each culture, 20 ml of the respective medium is inoculated with 100 μl of corresponding short term stock stored at −20° C. The cultures are allowed to reach saturation on a shaker at 20° C. (typically it takes ~4 d for the first growth).

While the first growth is on-going, the experimental setup is filled with 50 ml of sterile culture medium and an oil droplet is dispensed and pinned as described above. After verifying sterile conditions, and with the "precision pump" (FIG. 2) off, the medium is inoculated with 100 μl of the saturate culture grown on the shaker through the sterilized "access valve" (FIG. 1). The inoculated culture circulates in the "culture loop" (FIG. 2) isolated from the microchannel until the optical density at 600 nm wavelength is $OD_{600}$=0.4. Once the desired $OD_{600}$ is reached, the "precision pump" is turned on to flow the microbial culture into the microchannel and the experiment begins.

Microfluidic channel design. The microfluidic channel can be designed to fulfill the following functions: (i) capable of producing a single sub-millimeter oil droplet (e.g. 100 μm) on the platform; (ii) capable of trapping the generated droplet in a location while preserving its circular shape, maintaining an oleophobic contact angle with the top and bottom channel walls, and thus closely emulating the hydrodynamics around a rising micro-droplet; and (iii) able to withstand the long-term observation that lasts weeks. The microfluidic platform comprises a polydimethylsiloxane (PDMS) microchannel bonded to a glass microscope slide with air plasma. The channel was fabricated using traditional soft lithography techniques, which ensure the easiness of applications and transfer of the technology.

Principle of single droplet generation. Generating an oil droplet in a continuous aqueous phase, as opposed to an aqueous droplet in a continuous oily phase, is challenging due to the affinity of an oil droplet to spread over the PDMS hydrophobic microchannel walls (FIG. 1A) and consequently fails to maintain its circular shape and oleophobic contact angle. To overcome this problem, the inner walls of the microfluidic platform can be made hydrophilic to result in the oleophobicity necessary for the dispersed oil. One common practice is to use oxygen plasma to activate PDMS and glass substrates of the microchannel and subsequently to increase their hydrophilicity. Although simple, the effect is unfortunately temporary (i.e. functionalized hydrophilic PDMS will revert back to be hydrophobic in ~8 hours) and not suitable for long-term experimentation. Alternative methods are to salinize the channel's inner walls in-situ. However, salinization in microfluidics involving only physical deposition of silane materials will be rapidly degraded by flow shear. In practice, many salinized microfluidics will lose the functionalized layer in ~30 min usage.

A technique to coat a durable hydrophilic polyelectrolyte multilayer (PEM) on all inner walls of the device including the PDMS microchannel and glass substrate via an in-situ layer-by-layer deposition method was utilized. This PEM coating permanently reduces the water-air-PDMS contact angle from ~110° to ~20° (FIG. 1B). Due to the aqueous phase having a much higher affinity towards the hydrophilic coating, the walls effectively become oleophobic (FIG. 1D), which is in contrast to an untreated PDMS microchannel (FIG. 1C). Most importantly, the functionalized microfluidics can sustain severe flow shear and long-term contact with oil phase for weeks without losing its functionality.

To form the droplet, a flow focusing junction was utilized wherein oil was pinched from two sides by an aqueous buffer flow to produce a droplet (FIG. 2 inset). Control protocols to facilitate the single droplet generation (FIG. 2) have been developed and discussed in details later. After generation, the droplet was advected through a 200 μm wide and 120 μm deep nozzle (Inset in FIG. 2) and ejected by the flow into the main channel. The droplet was immobilized by being pinned at the top and bottom of the main microchannel where the microbial interaction experimentation took place (FIG. 2).

Immobilization of droplet and its hydrodynamics. For long term microcosm experimentation, the oil droplet should be immobilized in a desired region of the channel and the flow around it must closely emulate that around a rising micro-droplet. Contrary to conventional trapping methods, the oil droplet was immobilized in a microchannel by directly pinning it at the top and bottom walls. Initially after the droplet leaves the nozzle (FIG. 2 inset), it moved freely through the 11 mm wide channel while in contact with the top (PDMS) and bottom (glass) walls coated with the PEM. This hydrophilic multilayer is very durable and remains effective after the generation of many droplets under severe flow shear (>1000 $s^{-1}$ or >4 $mm \cdot s^{-1}$) over days. However, once the crude-oil droplet remains stationary for an extended period (e.g. from several hours to a day, depending on the specific oil and aqueous phases), it became pinned at polyelectrolyte multilayered surfaces. Once pinned, the contact lines were immobilized and the contact areas between the droplet and the surfaces remained constant. It is particularly worthwhile to emphasize that although pinned, the oil-water-surface contact angles at both walls remained oleophobic, which is evidence that the "pinned" droplet had a maximum circular cross-section at the channel's mid-plane parallel to the top and bottom walls. The pinning force is sufficiently large to withstand the droplet drag generated by flows at least 10 times as fast as the Stokes rising velocity of a droplet with an equivalent size (e.g. 4 $mm \cdot s^{-1}$ for a 200 μm drop). Anecdotally, the oleophobic pinned droplet has been observed in a continuous flow for over one month. Note that owing to their small sizes, inertia of micro-droplets is negligible and gravity plays insignificant roles in determining the hydrodynamics around each individual drop. Consequently, flow around a rising micro-droplet can be simulated by an advection flow driven by pressure difference around a stationary droplet in a microchannel.

Setup and procedure. The close-microfluidic platform (illustrated in FIG. 2) including a microfluidic channel, a reservoir, two pumps and connecting tubing to form two recirculating loops (i.e. a primary loop for continuous in-situ observations with accurate hydrodynamic conditions and a bypass loop for maintaining suitable chemical and biological microcosm environments) was suitable for a wide range of biotic and abiotic experimentations. To setup a biotic experiment for oil-microbe interaction studies, the microfluidic platform was first filled with the sterilized culture medium, after which a single oil droplet was dispensed on-chip and subsequently pinned in the observation area located in the middle of the 11 mm wide microchannel (FIG. 2). The medium was then inoculated with the saturated grown culture through the "access valve". The culture was allowed to grow in-situ to the mid-log growth (or desired growth stage) via the bypass loop, during which time the primary loop remained closed to the microbial suspension. Once the culture reached desired growth condition, the primary loop was activated by a "precision pump" in FIG. 2, enabling real-time observations with controlled flow rates. For an abiotic experiment, the microfluidic platform was flooded with sterilized solutions (e.g. containing extracellular polymeric substances, EPS, for studying the mechanisms of marine snow formation). After a single stationary droplet was established in the microchannel, the suspension was allowed to interact directly with it. Additional particulates (e.g. latex particles) can also be introduced through the same "access valve" in the return segment of the bypass loop.

Microcosm experiments of microbial interactions with a rising oil droplet. To validate the microfluidic platform, kernel experiments were performed on three bacterial isolates (*Pseudomonas* sp. ATCC 27259, *Alcanivorax borkumensis*, ATCC 700651. *Marinobacter hydrocarbonoclasticus*, ATCC 27132) and crude oil (Macondo surrogate). Each isolate was first incubated in its growth medium on a rotary shaker until a stationary growth phase was reached. Meanwhile the setup materials were sterilized and assembled, and a droplet was generated and pinned in the observation area of the microchannel (FIG. 2). The sterilized medium (e.g. 50 ml) was allowed to circulate through the setup (i.e. both loops) for at least 24 h to verify sterile conditions prior to the inoculation at the beginning of each experiment.

With the precision pump off (FIG. 2. i.e. the primary loop is blocked), the setup was inoculated with the saturated growth culture (e.g. ~1 ml). The culture was then cultivated on-chip through the "culture loop" until it reaches lower mid-log growth (i.e. optical density at 600 nm, $OD_{600}$, reaches 0.4). Once the experimental conditions were established, the precision pump was turned on and the bacterial culture begins to flow past the droplet at 2 mm $s^{-1}$ (approximately the Stokes rising velocity of a 150 μm oil droplet, $\rho_{oil} \approx 850$ kg $m^{-3}$, rising in water). Time lapse microscopy at 30 s intervals recorded bacterial aggregation forming directly on the droplet surface.

Example 2

Image Acquisition and Analysis and Flow Measurements

Image acquisition. Observations of the microfluidic platform of Example 1 can be made using a Nikon Ti-E microscope with Nikon 20× S Plan Fluor ELWD objective and differential interference contrast (DIC) microscopy. Two cameras operate simultaneously to record time-lapse images as well as high speed images. Through the left camera port, a 1K×1K EMCCD camera (Andor DU-888) records images every 30 s for the duration of the experiments which are streamed directly to a data storage (24 TB data server). Through the right camera port, an 1K×1K CMOS high-speed camera (IDT NR4S) records images at 1000 fps for 1 second period every 10 min such that at least 1000 images are recorded per period. A custom MATLAB script prompts the microscope to automatically switch between ports and synchronize cameras allowing experiments to run unattended.

Image analysis and flow measurements. High speed images acquired with the IDT NR4S CMOS camera are used to obtain flow measurements using micro-particle image velocimetry (μPIV)-assisted particle tracking velocimetry (PTV). The measurement area is 720×720 μm using the Nikon Ti-E microscope with a 20× objective, and the depth of field is 5 μm so flow measurements are averaged over a 5 μm thickness. The microscope is focused at the mid-plane of the channel. The suspended bacteria cells (or other particles if applicable) are used as flow tracers. Since μPIV techniques have been used extensively in the literature, a concise summary is provided herein. Following image acquisition, every two consecutive images in the sequence undergo conventional cross-correlation PIV analysis. For a given frame, the bacterial cell locations are determined and in the following frame their new positions are found with the assistance of the PIV velocity map i.e. PIV-assisted PTV. Thus for each cell location in an image, a velocity vector is found. With bacterial concentrations approaching ~$1\times10^6$ cell $ml^{-1}$ typically on the order of ~1000 cells are located in a frame. Over the entire sequence an order of ~$1\times10^6$ velocity vectors are measured which are mapped onto a 4 pixel (2.7 μm) grid using a Taylor expansion scheme.

Figure 3:
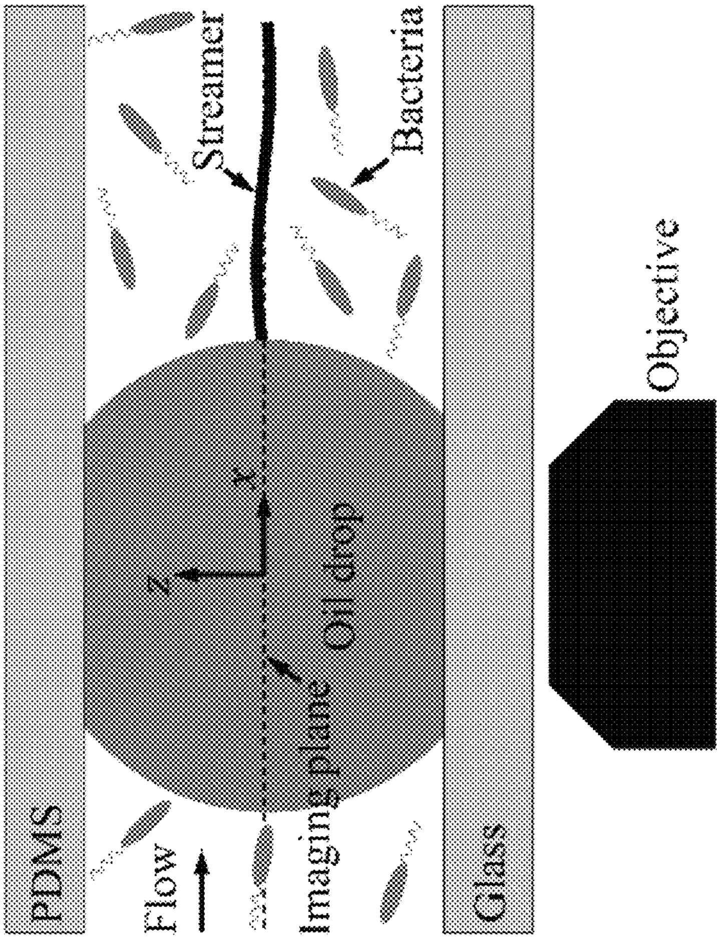
Figures 4A, 4B, 4C, 4D, 4E, 4F:
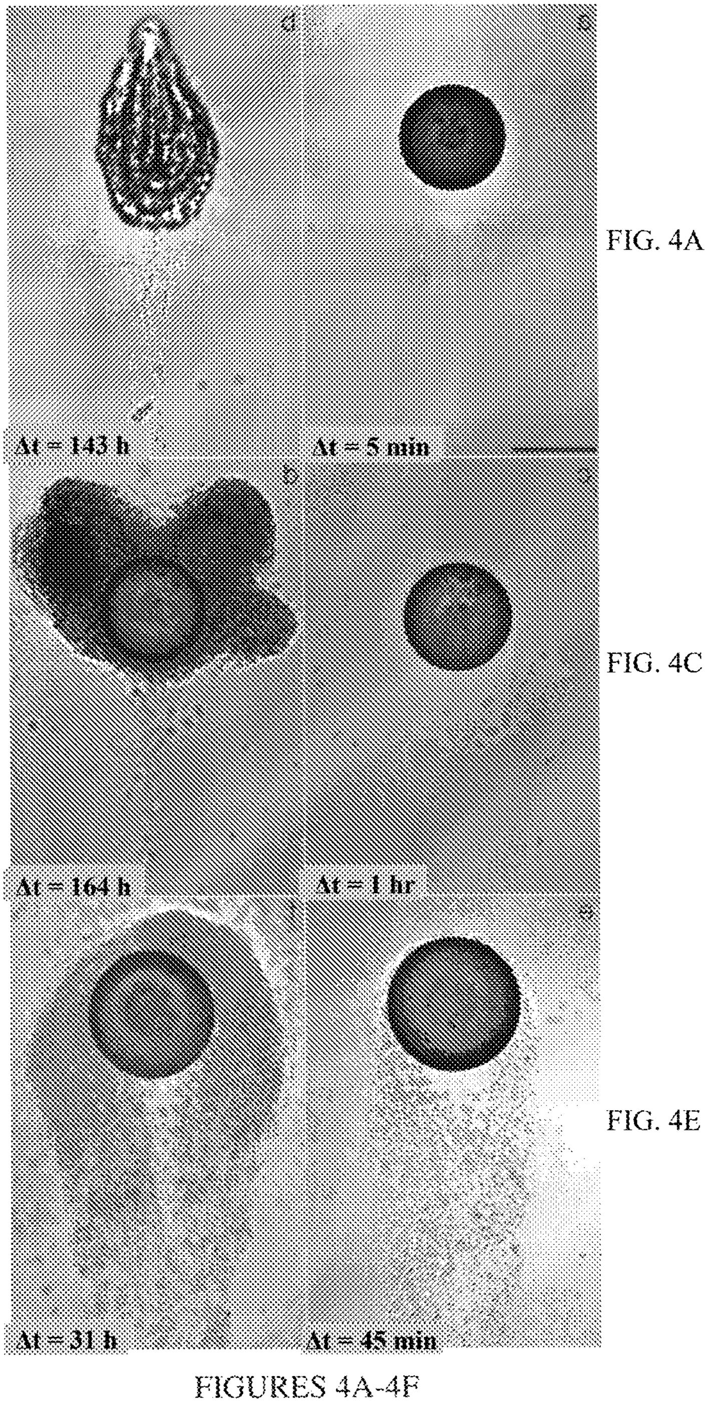

The real-time interactions were observed by an inverted microscope (Nikon Ti-E, FIG. 3) at 20× magnification (S Plan ELWD Fluor. Depth of Field of ~5 μm) equipped with a 1K×1K EMCCD camera (Andor iXon) for time lapse imaging and a 1K×1K CMOS high speed camera (IDT-NR4) for flow measurement over an area of 720×720 μm at resolutions of 0.7 μm. With the "time-lapse" camera, images were taken at regular intervals (e.g. 30 s) for the duration of the experiment (e.g. several days or weeks). With the "high-speed" camera, images were recorded at high speed (e.g. 1000 frame $s^{311}$ for 1 s) at a larger interval (e.g. every 10 min). The time-lapse camera records long term observations of droplet and its morphological changes as well as various phenomena occurring at the oil-water interface, such as microbe adsorption, aggregation and migration, while the high-speed camera allowed for measurements of the flow around the droplet using suspended particles and subsequently evaluated associated hydrodynamics (e.g. drag, viscous stress distributions including normal, shear stresses and pressure).

The time-lapse recordings clearly revealed the formation of polymeric aggregates around a droplet under flow but also the drastic differences in temporal processes and structural characteristics in these aggregates among the three isolates (FIGS. 4A-4F). In the *Alcanivorax* experiment (FIGS. 4A-4B), filamentous structures comprising extracellular polymeric substances (EPS) and attached bacteria (i.e. streamers) formed within 30 min, but they were incapable of remaining attached. Meanwhile a thin film of bacteria cell and EPS, with a thickness of up to several cell width (e.g. ~4 μm) formed around the entire droplet.

In contrast, the *Marinobacter* experiment (FIG. 4C-4D) developed a film up to ~50 μm thick with a majority of the accumulation at ±450 left and right from the leading stagnation point. The film appeared quite malleable and continually flows towards the rear of the droplet. Once collecting at the rear, chunks of the film began sloughing off. The droplet never developed a wrinkly skin like the *Alcanivorax* experiments, and the droplet size did not change significantly over the course of 8 d of observation.

In the third experiment, *Pseudomonas* (FIGS. 4E-4F) formed very rapid streamers within the first hour which were stable enough to grow into a large tail that extends >10 droplet diameters downstream. After 14 h, the tail began to disperse both through shear erosion along the outside and central hollowing in the inside. At the end of the first day the film grew back denser and stiffer and a long tail reformed, indicating some kind of "life cycle" of the *Pseudomonas* aggregate. These three examples demonstrate wildly different aggregation behavior and only scratches the surface of the extremely complex microbiological processes at a rising oil droplet.

Figures 5A, 5B, 5C, 5D, 5E, 5F:
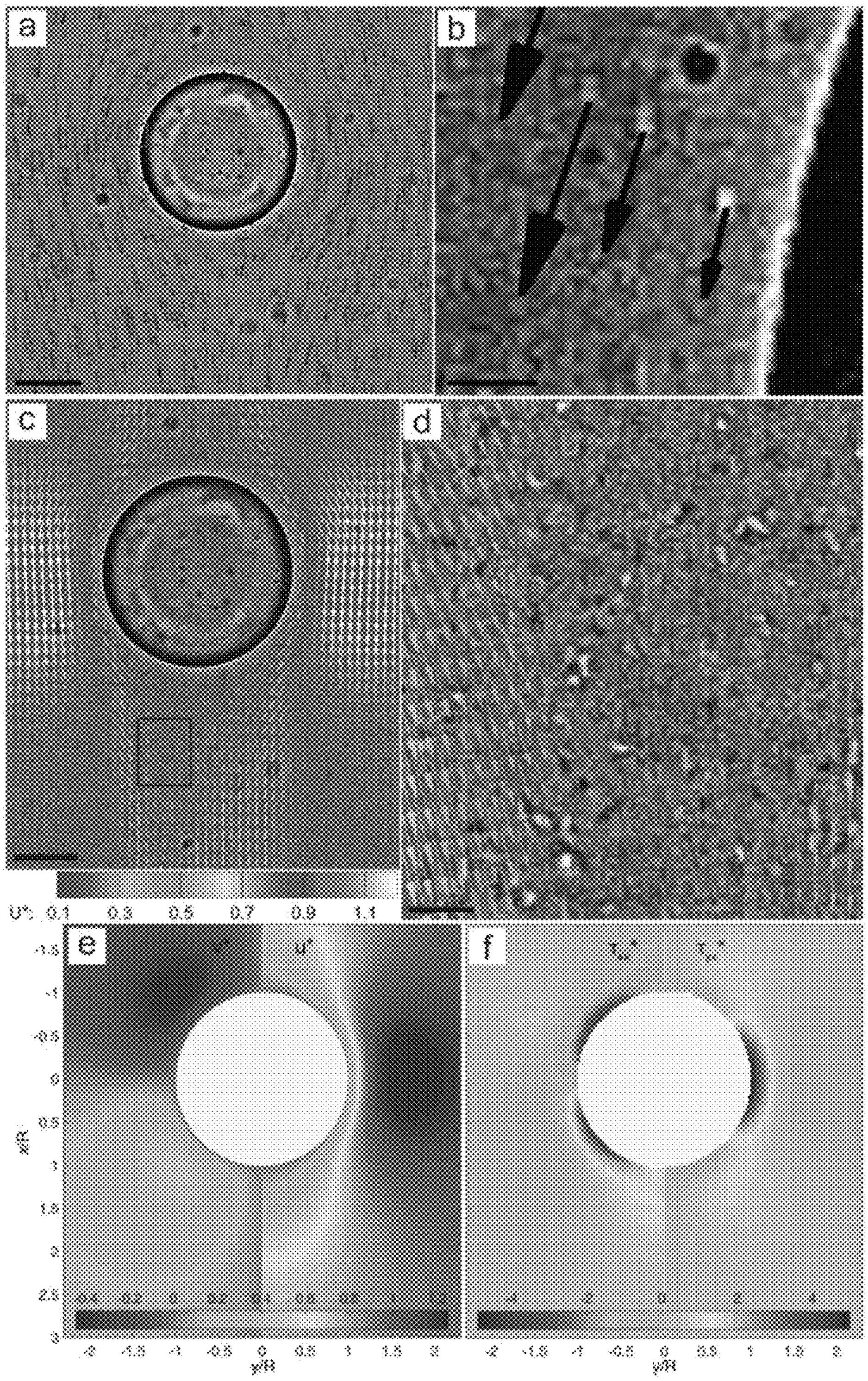
Figures 6A, 6B, 6C, 6D, 6E, 6F, 6G, 6H:
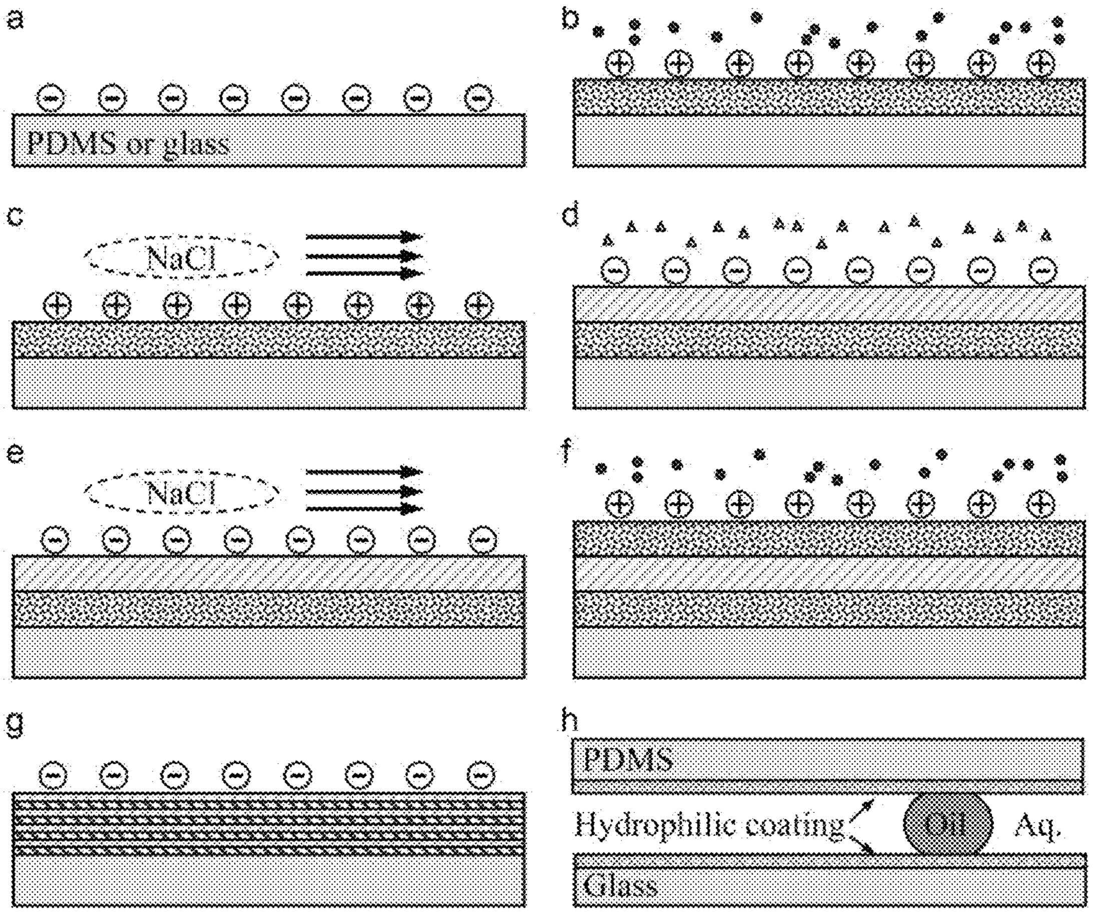

Flow measurements around a "rising" droplet. In addition to aggregate morphology, the microfluidic platform is capable of providing highly resolved simultaneous flow measurements for providing quantitative insights into hydrodynamic impact of colloidal aggregates on the transport of oil droplets (e.g. rising velocity). To demonstrate, experiments using the *Pseudomonas* sp. were performed with the same experimental procedure. Images were recorded at 1000 fps for a 1 s period at intervals of 10 min. The individual suspended bacteria were used as flow tracers and their positions were tracked from frame to frame to produce the displacement of microbes (FIG. 5A-5B). Using particle tracking velocimetry (PTV), the instantaneous velocity maps allowing flow measurement very close to the interface (FIG. 5A) were obtained. This near interface measurement capability is highlighted in FIG. 5B. i.e. the closest velocity measurement was located in ~2 cell body length closest to the interface. Each high speed sequence of 1000 images produced ~$3\times10^6$ unstructured velocity vectors per time step, which were interpolated onto structured grids to produce highly resolved (e.g. a vector spacing of 2 um) velocity map (FIG. 5*c-d*). Note that vectors in FIG. 5C are shown one in every seven in the streamwise (x) direction and one in every five in the transverse (y) direction. The unprecedented measurement resolution is highlighted in FIG. 5D showing flow near nanometer polymeric filaments (marked by sporadically attached bacterial cells with red). The high resolution measurements allowed direct assessment of budgets in streamwise momentum balance: $Re_{D_d}(\vec{u}^*\cdot\vec{\nabla}^*)\vec{u}^*+\vec{\nabla}^*p^*-\vec{\nabla}^*\cdot\vec{\nabla}^*\vec{u}^*=0$, where the superscript "*" denotes the normalized quantities or operators and "$\nabla$" is the gradient operator, as well as $Re_{D_d}$ is a dimensionless parameter based on droplet diameter ($D_d$). Lengths are scaled by $D_d$, velocities by incoming flow velocity ($U_f$), and stresses by $\mu_f U_f/D_d$ where $\mu_f$ is fluid viscosity. Normalized velocity magnitudes are shown in FIG. 5E, and viscous stresses ($\vec{\nabla}^*\cdot\vec{\nabla}^*\vec{u}^*$) in FIG. 5F, from which the elusive pressure gradients can be approximated.

The drastic differences in aggregate morphology and interfacial response between the three isolates is striking in FIGS. 4A-4F, and suggests a rich future for this experimental platform to delve into the essentially unexplored wide array of microbial responses to oil-water interfaces. This is considerably enhanced by the additional flow field measurements (FIGS. 5A-5F) which allow for elusive quantification of the physical impact of these active colloids at sheared oil-water interfaces.

Example 3

Fabrication of Microfluidic Channel Composition and Microfluidic Platform

The instant example provides an exemplary microfluidic channel composition and an exemplary microfluidic platform according to the present disclosure.

Figure 12:
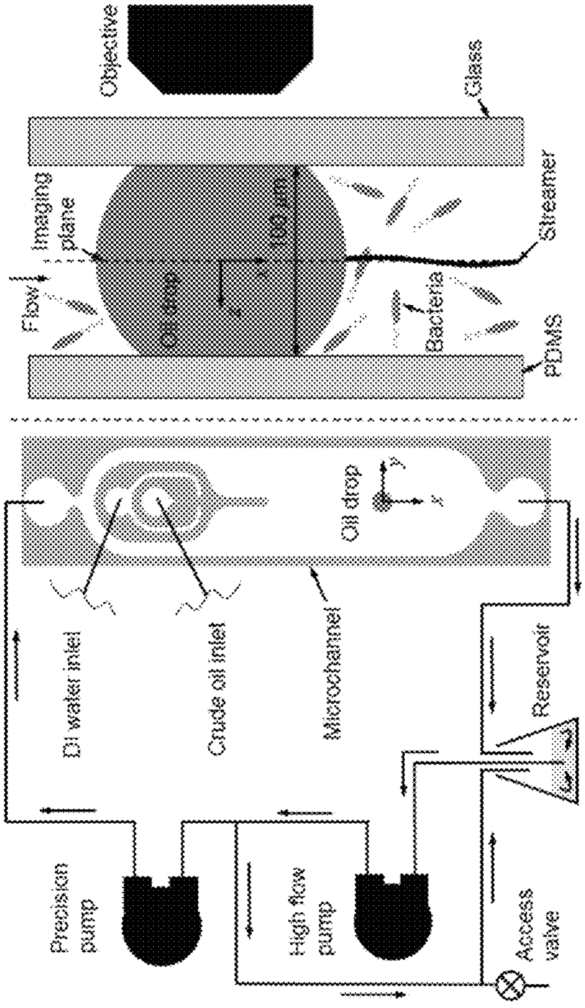
FIG. 12 shows schematics of the microfluidics platform for mechanistic microcosm experiments. (Left) microfluidics platform with annotated components, (Right) Side-view of a pinned droplet in the microchannel viewed directly by a Nikon microscope (Nikon Ti-E) at the magnification of 20×.

Microfluidic platform. The experimental setup comprises a chemostat/reservoir (150 ml flask), two peristaltic pumps, and a microfluidic channel (FIG. 12). These components are interconnected with soft ¼" Tygon tubing (Cole-Parmer) while 1/16 in PEEK tubing (IDEX) is used to connect the microfluidic channel. Proper PEEK fittings (IDEX) connecting to PEEK tubing and polypropylene fittings (Cole-Parmer) connecting to Tygon tubing are selected to establish the closed-loop microcosm environment.

There are two flow loops in the microfluidic platform: a primary loop for continuous in-situ observations of microbe-oil interactions and a bypass loop to support in-situ microbial growth and monitoring. During each experiment after dispensing and pinning the droplet in the microchannel, fluid drawn from the reservoir by a high flow peristaltic pump (INTLLAB) operated at a fixed 50 rpm with 1 mm inner diameter silicone tubing is split into two different loops at the T-junction. As a portion of the fluid enters into the main loop, the rest recirculates directly back to the reservoir via the bypass loop within which an access valve is integrated for removing or adding fluids. The fluid in the main loop is further pumped by an additional high precision micro-peristaltic pump (Masterflex C/L, Cole-Parmer) with Masterflex tubing. This micro-peristaltic pump provides exquisite flow control to regulate the flow rate in the microfluidic channel and eventually return to the reservoir. Periodic fluctuations inherent to peristaltic pumps still exist and may affect flow measurements around a droplet in the microchannel. It is found that at flow rates of about 150 μl $min^{-1}$ (typical experimental flow rates) the flow regularly fluctuates at approximately 10 Hz. These fluctuations will not affect experiments and analysis based on mean flow if sufficient periods of flow fluctuation are captured and averaged.

The observation area in the microchannel, where an oil droplet is pinned, is imaged using a Nikon TiE transmission microscope with either 20× S Plan Fluor ELWD objective for differential interference (DIC) or 20× Plan Fluor DLL for phase contrast microscopy. The microscope is equipped with a large format EMCCD camera (iXon. Andor) for the long term (>days) time lapsed images and a high speed 1K×1K CMOS camera for flow measurements. High speed images are recorded exclusively with the S Plan Fluor ELWD objective which has numerical aperture 0.45 and depth of field ~5 μm. A newly developed microfluidic channel allows the generation of a single oil droplet with well-controlled size and the pinning of it at the observation area located in the open section of the microfluidic channel (as illustrated in FIG. 12). An oil droplet generation and dispersion subsystem is also developed using two individually controlled syringe pumps (New Era Pump) for dispersing oil and sterilized DI water as a buffer solution. The oil syringe is a chemically inert glass syringe (Hamilton Gastight, Fisher), while a 3 ml polyethylene syringe (BD) is used for the buffer.

Figure 13:
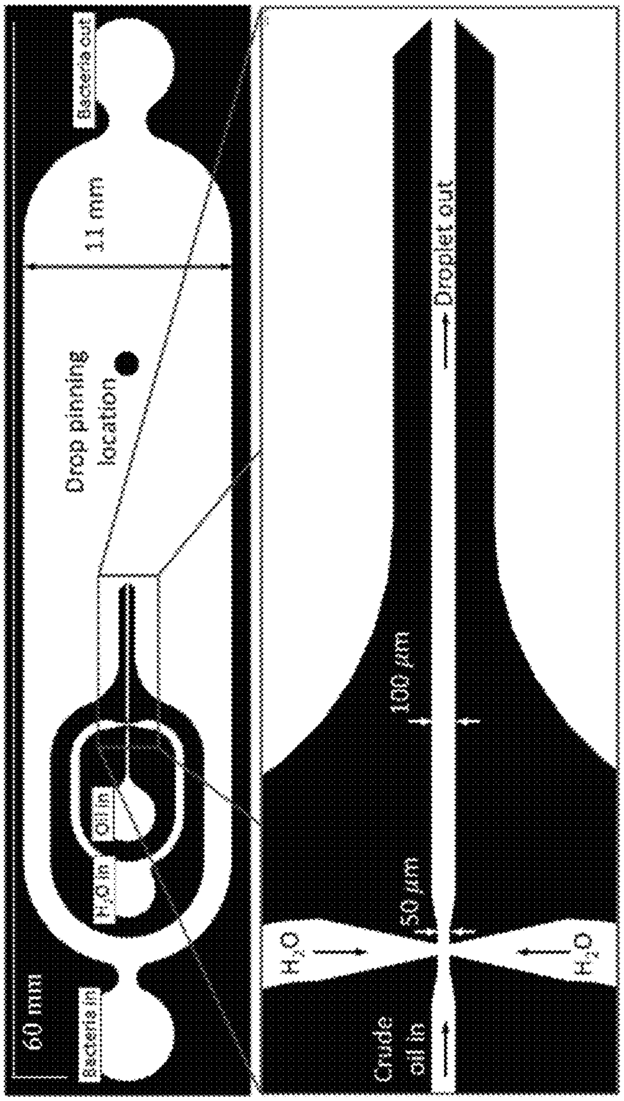
FIG. 13 shows a layout of microchannel. Inset: flow focusing junction for the generation of a single oil droplet with a size of 100-600 μm.

Microfluidic channel. The channel is capable of dispersing single oil droplet with well controlled droplet size. FIG. 13 shows the mask schematics of the microchannel. The symmetric microchannel of 60×11×0.1 mm, latter being the depth, has two primary fluid ports for the continuous fluid circuit connected to PEEK tubing, where bacterial suspensions can be driven into and out of the channel. A co-axial flow nozzle with flow focusing junction is designed to generate a single oil droplet with accurate size control. Shown in the inset of FIG. 13, the nozzle has two separate inlets: through the inner one the oil is injected to allow the generation of droplet, while through the outer one the buffer fluid (e.g. DI water) is injected to provide the oleophobic layers over the nozzle walls. The four-way junction with the narrowest cross-section opening of 50 μm is used to create flow focusing to facilitate the pinch off of a single droplet with well controlled size.

The microfluidic channel is fabricated by soft lithography technique using poly(dimethylsiloxane) (PDMS) (Dow Corning). A chrome mask with the designed 2D microchannel and nozzle is generated using a Heidelburg mask writer. The use of a hard chrome mask instead of conventional soft film mask is necessary to produce a microscale flow focusing junction with sharp and straight side walls. The negative master of 100 μm deep microchannel is created by using SU-8 photoresist and patterned by photolithography. To create the master, a 100 μm layer of SU-8 negative photoresist (SU-82075, MicroChem) is spin-coated at 2200 rpm for 30 s over a 4 in Si-wafer, soft baked on a hotplate at 65° C. for 5 min first and followed by another soft bake at 95° C. for 20 min. The coated wafer is patterned by a Carl Suss mask aligner for 30 s using hard contact mode. The resist undergoes a post-exposure bake at 65° C. for 5 min and subsequently at 95° C. for 10 min. The master is developed in 1-methoxy-2-propanol acetate (Fisher) at room temperature for 17 min to fully reveal features of the microchannel. The baking protocols are followed to prevent thermal induced cracks often developed at the nozzle.

Microchannels are formed by molding PDMS over the master. PDMS is mixed at a ratio of 10:1 PDMS to cross-linking agent and degassed in a desiccator. The mixture is cast on the master and cured in an oven at 65° C. for 1 d. The cured PDMS mold is cut from the master, and holes for inlets/outlets are punched using a 1.5 mm biopsy punch. The PDMS channel is bonded to a glass slide pre-cleaned with "piranha" etch solution (99% $H_2SO_4$ and 30% $H_2O_2$ at 1:2 v/v) using air plasma activation for 1.5 min in a plasma cleaner (Harrick). A surface functionalization is preformed immediately after, since all inner surfaces of the channel made of glass and PDMS can be hydrophilic.

Layer-By-Layer (LBL) surface functionalization. Formation of isolated crude oil droplets in the microchannel should maintain all contact surfaces as oleophobic. Note that PDMS is inherently hydrophobic and oleophilic due to its non-polar functional groups. Thus, oil naturally spreads on PDMS, making a droplet on-chip impossible. By forming a strongly hydrophilic surface, water would have a high enough affinity for the channel walls such that the water essentially blocks the crude oil from coming in contact with the channel surfaces, forming in effect an oleophobic surface.

A layer-by-layer deposition technique was used to form a polyelectrolyte layer on both PDMS and glass surfaces in the microchannel. Immediately after bonding the PDMS mold to the glass substrate using air plasma treatment, the channel is filled with 10 μM poly(allylamine hydrochloride) (PAH). The PAH bonds to the charged channel walls and reverses the wall charge from negative to positive. After 5 min. the PAH is removed from the channel and rinsed thoroughly with 0.1 M NaCl buffer solution to remove remaining free PAH. Then the channel is filled with 10 μM poly(sodium 4-styrenesulfonate) (PSS). The PSS bonds to the PAH layer, reversing the charge from positive back to negative. After 5 min. the PSS is removed and washed thoroughly with 0.1 M NaCl buffer solution to remove free PSS, and the channel is filled with PAH again. The washing step is utilized due to free PAH and PSS easily forming salts, which can contaminate the surface or even clog the channel.

The process is continued with alternating PAH/PSS depositions until the desired number of PAH-PSS layers are formed. Four layers of PAH-PSS are used in current example. Following the final deposition of PSS, the channel is rinsed thoroughly with DI water. Anecdotally, channels functionalized with the PAH-PSS coating are successfully used several months after manufacture, demonstrating the robustness of the technique. Additionally, a pinned crude oil droplet in the functionalized microchannel can maintain both its pinned state and oleophobic contact angle with the PDMS and glass for at least three weeks of continuous flow, demonstrating the durability of the coating.

Example 4

Evaluation of Fabrication of Microfluidic Channel Composition and Microfluidic Platform with Extracellular Polymeric Substances (EPS)

Observations of the microfluidic platform of Example 3 are made in the instant example.

Experimental conditions. The conditions for experiments discussed in the main text are summarized in Table 1. Each experiment is labelled in Column 1 of Table 1, and so are their corresponding main text figures (Column 2). The experimental conditions are organized into three categories: characteristics of oil phase, particle phase and flows used in each experiment. Note that the first set of experiment (E1 in Table 1) is abiotic.

TABLE 1

Experimental conditions for microcosm experiments with their corresponding figures. ASW: sterilized Artificial Seawater. Stokes rising velocity is calculated using $u_d = (SG - 1)gD_d^2/(18v_f)$, where SG is the specific gravity for oil to surrounding fluids, $\rho_{oil}/\rho_f$, and $v_f$ is the kinematic viscosity. All estimations in Table 1 are performed at 20° C., and SG is assumed to be 0.9 for a slightly weather oil.

| | | Oil droplet characteristics | | | Flow | Particulate suspension characteristics | | | |
|---|---|---|---|---|---|---|---|---|---|
| Exp. | | Oily phase | Size | Stokes speed | Flow | | 1 μm Beads | | |
| ID | FIG. | medium | $D_d$ (μm) | $u_d$ (mm/s) | $U_f/u_d$ | Suspension medium | (Bds/ml) | Microbes ($OD_{600}$) | |
| E1 | 7A | Macondo | 170 | 1.5 | 1.67 | DI water | $10^a$ | No bacteria | |
| E2 | 7B | surrogate | 170 | 1.5 | 1.46 | (<1 ppm SDS) | | Contamination (OD < 0.01) | |
| E3 | 7C | crude (MC) | 122 | 1.15 | 1.6 | ASW (25 ppt) + *Sagittula* EPS (10 mg · $l^{-1}$) | | *Sagittula stellata* (OD < 0.01) | |
| E4 | 7D | | 154 | 1.23 | 1.0 | ASW (25 ppt) + GOM consortia EPS (1 mg · $l^{-1}$) | | No bacteria | |
| E5 | 7E-7F, 8 | | 175 | 2.74 | 1.3 | Difco marine nutrient broth medium (8 g · $l^{-1}$) | N.A. | Pseudo-monas sp. (P62) | OD 0.35 |
| E6 | 7G | MC + 9500A (0.1% v/v) | 250 | 3.24 | 2.8 | | | | 0.56 |
| E7 | 9A-9D 10A-10G, 11 | MC | 240 | 2.99 | 0.74 | | | | 0.41 |

Culturing protocol of bacterial suspension. The biotic experiments in this example involving *Pseudomonas* sp. (strain P62. ATCC 27259) use a two-step growth protocol. The first growth is conducted in a flask on a rotary shaker. The 20 ml of sterile Marine Nutrient Broth (8 g $l^{-1}$, Difco) is pipetted into a sterilized flask and inoculated with 100 μl of −20° C. short term stock. The inoculated culture remains on a rotary shaker at 120 rpm and at room temperature (23° C.) until it reaches saturation growth (~4 days and $OD_{600}>1$). This culture is used as the working stock for the microcosm experiments.

At the beginning of each microfluidic platform after a crude oil droplet is dispensed and pinned in the microchannel, the reservoir is filled with 50 ml nutrient broth and the entire system is primed. With the high precision pump off 100 μl of the working stock is inoculated through the access valve (FIG. 12). The high flow pump circulates the culture overnight through the bypass loop isolated from the microchannel to allow the culture to grow without interacting with the pinned droplet. When the culture in the reservoir reaches the lower mid-log growth ($OD_{600}\approx 0.4$), the precision pump will be turned on to allow bacterial suspension to flow into the main loop and to interact with oil droplet. From herein on, the microcosm experiment starts.

Preparation of particle suspensions with various purified EPSs. For comparative abiotic studies (E1-E4 in Table 1, FIGS. 7A-7D), 1 μm polystyrene particles are used to mimic bacterial cells in these experiments. Before adding particles, the media (e.g. DI water in E1-2, 25 ppt NaCl in E3-4) are mixed with purified EPS extracted from either *Sagittula stellata* culture or microbial consortium from Gulf of Mexico at the concentration equivalent to those in the water column. The media is sterilized with a 0.2 μm filter; this step is performed under a sterilized environment (e.g. a laminar hood with UV lamp) for preventing contamination. The sterile EPS suspension flows through the microchannel containing the pinned droplet for 24 h, and then the polystyrene particles are introduced through the access valve. Daily examination of suspensions under a separate microscope (Nikon TS-100) ensures abiotic condition during microcosm experiments. In experiment E2 (FIG. 7B. Table 1), accidental contamination causes the formation of streamers within one day after exposure to EPS-particle suspension. To showcase the impact of a small amount of live bacterial cells in EPS-particle suspension on the morphology of EPS aggregate, experiment E3 (FIG. 7C, Table 1) was conducted using the sterile EPS-particle suspension where the EPS is purified from *Sagittula stellata* culture[54] and spiked with live *Sagittula* bacteria ($OD_{600}<0.01$), as well as the experiment E4 (FIG. 7D, Table 1) using only the sterile EPS-particle suspension (i.e. no bacteria) where the EPS is purified from indigenous consortia in Gulf of Mexico (GOM).

Disperse and pin a droplet in microchannel. At the beginning of each microcosm experiment, a single oil droplet is generated and pinned at the observation area in the microchannel. The single crude oil droplet is generated on-chip with a coaxial nozzle with a flow focusing junction (inset in FIG. 13) and two manually operated syringe pumps (New Era Pump). A Hamilton Gastight syringe is used for crude oil for precise dispensing. The second pump dispenses sterile DI water (buffer) from a sterile plastic syringe. With the high precision pump on and DI water syringe pumping at 10 μl·min$^{-1}$, the crude oil is injected at 100 nl·min$^{-1}$ (see FIG. 12 for schematic). In the microchannel the oil-carrying inner nozzle comes to the flow focusing junction with the water-carrying outer nozzle where a single crude oil droplet is pinched off. Immediately after the pinch-off the crude oil syringe is turned off. The droplet then flows into the 11 mm wide channel until reaching the position in the observation area (FIG. 12). When droplet is attached at this position, the high precision pump and DI water syringe pump are turned off. The setup is left in this state overnight to (i) allow the droplet to be pinned to the top and bottom channel walls, and (ii) verify the apparatus and medium are sterile. Following the verification that the droplet is pinned and the setup is sterile, the experiment is ready to be inoculated with bacteria.

Sterilization procedure. Sterilization is crucial for both abiotic and biotic studies to properly interpret the experimental results. All tubing, fittings (except the access valve), the reservoir flask, silicone stopper and syringes are autoclaved at 121° C. for 30 min. Non autoclavable components including the microchannel and access valve are washed thoroughly with 70% ethyl alcohol for sterilization for at least 30 min. Following sterilization, the tubing circuit is assembled in a laminar flow hood with UV and 50 ml of sterile medium is added to the reservoir flask. These components are then carefully setup on the Nikon Ti-E microscope according to the schematic in FIG. 12. Careful pre-check procedures (discussed above) are strictly followed to ensure the entire microcosm setup is sterile before introducing bacteria.

Image acquisition. A Nikon Ti-E microscope at 20× magnification—Nikon Plan Fluor DLL (for phase contrast) or S Plan Fluor ELWD (for differential interference contrast or DIC)—is used to provide both time-lapsed observations and flow measurements during experiments often lasting for days. Two image streams, e.g. long term time lapsed images to monitor the morphology change of droplet and time evolution of flow fields around it, are acquired concurrently by two different cameras with proper synchronization. With an 1K×1K EMCCD camera (Andor), time lapsed images are acquired every 30 s for the duration of each experiment, and streamed directly to a data storage. Concurrently, with an IDT high speed 1K×1K CMOS camera, a series of high speed image recordings are made at an interval of 10 min. Each high speed acquisition composed of 1000 images is recorded at 1000 fps for 1 s to the on-camera memory and automatically downloaded to data storage after each acquisition. Using a custom automation Matlab script, the microscope automatically switches back and forth synchronously between the camera port of EMCCD and that of CMOS camera. Both cameras are automatically triggered internally to capture both image streams continuously, i.e. one stream records images of oil water interface every 30 s, while the other provides flow measurements every 10 min, which allows the experiment to run unattended for days.

Figures 7A, 7B, 7C, 7D, 7E, 7F, 7G:
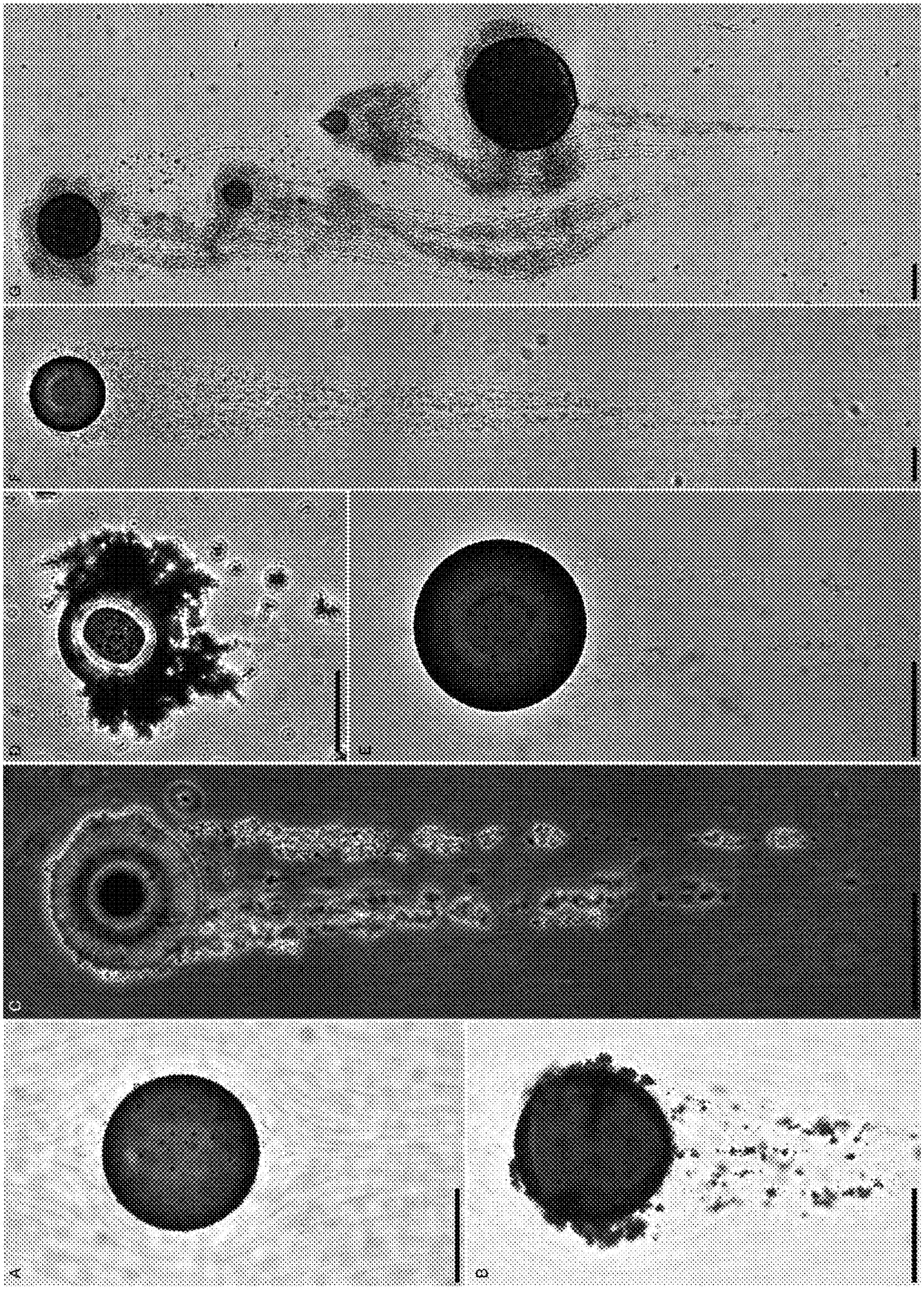

Formation of MOS around a single rising droplet. Using the microfluidic platform, long-term microcosm experiments lasting ~3 d were conducted to demonstrate first that EPS aggregates (i.e. EPS, cells, and particles) can form at a sheared oil-water interface, such as around a rising oil droplet (FIGS. 7A-7G). Before each microcosm experiment (conditions summarized in Table 1), a single ~180 μm crude oil droplet ($D_d$=183±46 μm) is generated and pinned in a microchannel (μchannel) with a dimensions of 60 mm (L)×11 mm (W)×100 μm (H). While the oil droplet is pinned to the top and bottom channel walls, the oil-water interface of the droplet is initially mobile. The imaging plane (depth of field ~5 μm) is situated at the mid-plane of the channel far away from both walls to minimize near wall effects. The pinned droplet is subjected to a flow driven by a peristaltic pump at speeds close to its Stokes rising velocity. $U_d=(\rho_d-$ $\rho_f)gD_d^2/18\mu_f$, where $\rho_d$ and $\rho_f$ are the density of the droplet and the surrounding fluid, and $\mu_f$ is the surrounding fluid dynamic viscosity. For clarity, hereinafter subscript "d" refers to the droplet and "f" to the surrounding fluid. All experiments are performed at 20° C. at which temperature the following analysis is performed. The hydrocarbon degrader *Pseudomonas* sp. (strain P62, ATCC 27259) culture was used as the model system in kernel experiments as well as various suspensions of sterilized 1 μm latex beads ($10^8$ $ml^{-1}$, FIG. 7A), latex beads with bacterial cells at low concentration (optical density at 600 nm wavelength $OD_{600}$<0.01. FIG. 7B), and sterile extracted EPS (1 to 10 mg $l^{-1}$, FIGS. 7C and 7D) in auxiliary experiments to highlight the study's ecological implications. In kernel experiments (FIGS. 7E-7G), a *Pseudomonas* suspension is inoculated and cultured in situ within the microfluidic platform. When the culture reaches its mid-log growth ($OD_{600}$≈0.4), the suspension is allowed to flow through the μchannel containing the pinned oil droplet, emulating the scenario that a rising droplet encounters an ocean layer rich with microbes.

Kernel experiments (FIG. 7E-7G) reveal that as a droplet encounters a dense *Pseudomonas* suspension (~$10^8$ cells $ml^{-1}$), within tens of minutes (e.g. 16 min in FIG. 7E) several thin EPS filaments containing bacteria are rapidly formed behind the droplet. Note that these apparently thin filaments (<<1 μm in diameter) are transparent and only observable via attached bacterial cells. Each filament with one end anchored directly to the rear of the oil droplet extends at least $2D_d$ downstream. These observations of filaments at a liquid-liquid interface draw parallels to the similar phenomenon occurring at a solid-liquid surface during the formation of a biofilm. e.g. "streamers." To emphasize their intrinsic similarity, these filaments are referred to as "streamers", i.e. elongated thin EPS threads attached randomly with bacterial cells or particles.

As time progresses, these individual streamers are bundled together to form a prominent tail extending $12D_d$ downstream (FIG. 7F). Focusing periodically on the top and bottom channel walls confirms that these streamers are formed at the mid-plane of the channel and not initiated from walls. As these streamers are forming and bundling around a dense pool of droplets, these polymeric tails encroach upon and connect to nearby droplets to form large mm-scale oily MOS particles demonstrated anecdotally in FIG. 7G. Here a network of four oil droplets is interconnected with streamer bundles forming a web of bacteria, EPS and oil droplets, i.e. a small MOS particle. These robust and rapid formations of streamers and streamer bundles in a matter of hours will have significant impacts on drag as discussed later, and the formation time scales are sufficiently short to substantially affect the rising velocity of oil micro-droplets as they encounter microbial blooms in a deep-sea plume.

We have conducted several auxiliary experiments (E1-E4 in Table 1. FIGS. 7A-7D) to identify key components in these processes. A control experiment using sterilized seawater (25 ppt) with 1 μm latex beads at $10^8$ bds·$ml^{-1}$ reveals that, except for sporadic adsorption of single beads, no aggregation is observed (FIG. 7A). However, an experiment using the same 1 μm latex bead concentration but with bacterial contamination ($OD_{600}$<0.01) yields streamers initiated on the droplet surface in less than 60 min which bundled together to form a tail after 11 h shown in FIG. 7B. This demonstrates that significant particle aggregation on the oil droplet requires secretions from bacteria. To further identify what materials produced by bacteria would initiate streamers, experiments were conduct using two sterilized particle suspensions ($10^8$ bds·$ml^{-1}$) containing (i) 10 mg·$l^{-1}$ "non-attached" EPS purified from *Sagittula stellata* culture as spiked with live *Sagittula* cells ($OD_{600}$<0.01 or 1000 cells·$ml^{-1}$) (FIG. 7C) and (ii) 1 mg·$l^{-1}$ EPS purified from natural assemblage collected near the Deep Water Horizon site (FIG. 7D). In both cases, particles aggregated around the droplet, while streamers are only formed in the suspension containing live *Sagittula* (FIG. 7C). It is concluded that with EPS, a MOS aggregate composed of particles, cells and oil can be readily formed directly on a rising crude oil droplet in less than 1 h. Formation of streamers, however, appears to require the presence of live bacteria independent of species (e.g. garden variety of bacterial contaminations in FIG. 7B and *Sagittula* in FIG. 7C) and even at extremely low concentrations (e.g. <1,000 cells·$ml^{-1}$ in FIGS. 7B & 7C. Table 1). Although details are still unknown, a minute number of live bacteria does appear to improve the elasticity of EPS and consequently is more prone to form streamers. These experiments support the assertion that streamer initiation and bundling is a mechanism robust enough to occur in real ocean environments such as during the Deep Water Horizon oil spill.

"Life cycle" of a streamer bundle behind a rising droplet. *Pseudomonas* sp. was used as the model system to elucidate the temporal evolution of a streamer bundle formed behind a rising droplet (FIG. 8A-8F). Although *Pseudomonas* is a motile hydrocarbon degrader, prior studies do not recover any specific taxis behaviors to crude oil nor any significant evidence of its motility impacting surface adsorption. Thus, the observations are applicable to any bacteria near an oil drop. FIGS. 8A-8F show the time evolution of a streamer bundle at Δt=0.2, 0.208, 0.667, 4.83, 21.55, and 30.883 h immediately after the droplet's exposure to dense *Pseudomonas* culture ($OD_{600}$=0.35). The mean flow speed is $U_f$=3.6 mm $s^{-1}$ into the μchannel where a micro oil droplet ($D_d$=175 μm) is pinned.

Figures 8A, 8B, 8C, 8D, 8E, 8F:
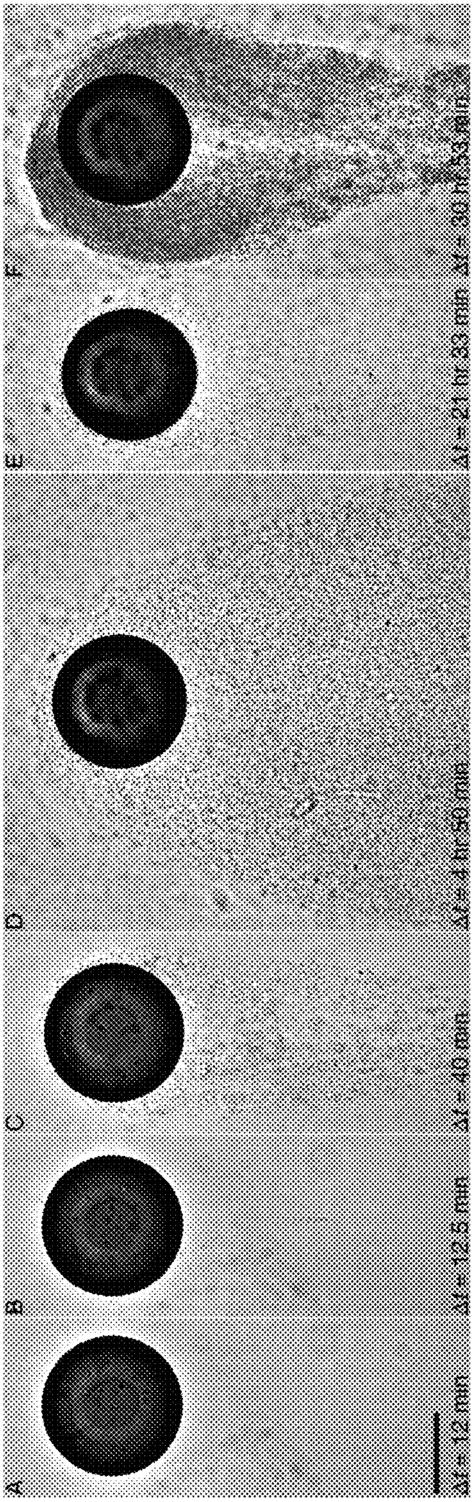

*Pseudomonas* containing EPS encounter the droplet at the leading edge and are driven by flow shear towards its trailing edge. Cells with EPS are quickly launched into the flow with one end firmly anchored at the oil-water interface, forming a streamer. The EPS streamer connecting cells is further stretched by flow shear and extruded to several droplet diameters ($D_d$) downstream (FIG. 7E). The streamer initiation is a rapid process that completes within 30 s demonstrated in FIG. 8A (no streamer) to FIG. 8B (with a streamer 30 s later). Since a single streamer is apparently relatively weak, it detaches easily from the droplet. This initiation and break-off of streamers occurs periodically within the first 30 min, after which streamers bundle to form a robust tail (FIG. 8C at 40 min after initial exposure). This bundle covers the entire droplet surface and extends up to >$10D_d$ downstream (FIG. 7F). Bacteria "trapped" in this polymer matrix are individually identifiable (bright rods with dark edges in FIG. 8C). Within several hours, the bundle evolves into a large oily EPS aggregate with a width of $3D_d$ and a length of $20D_d$. Note that it takes only 4 h 50 min to reach its maximum size and proliferation of cells (FIG. 8D). These timescales are similar to those reported for streamer formation on solid microchannel walls.

Analogous to the "dispersion" phase of a mature biofilm over a solid surface, it was observed that the dispersal of aggregates in streamer bundles and return to a thin polymer "shroud" covering the entire droplet (FIG. 8E). Note that the dispersal process took 15 h in FIGS. 8A-8E. Further examination of time-lapsed recording reveals that the process is composed of "erosion dispersal" at the outer edge and "seeding dispersal" (i.e. central hollowing) at the center of the tail. For traditional biofilms, "erosion dispersal" can be either an active bacterial process or passive (i.e. flow shear) process, whereas "seeding dispersal" is always an active process. This observation of active bacterial dispersal following initial colonization of an oil droplet has significant implications on bacterial degradation process in the water column. A short time later, a much more robust tail is re-formed (e.g. 9 h later in FIG. 8F). Note that the matrix in FIG. 8F is denser and cell concentration is higher than those in FIG. 8D. Although FIGS. 8A-8F only illustrate a single experiment, the abovementioned processes and their associated time-scales have been confirmed and validated by additional five duplicated experiments. Not only do polymeric aggregates comprising cells, particles and EPS form directly on an oil droplet surface, but also the formation process involves very drastic morphological changes and complex interactions by the nearby microbial community under flow shear via cell attachment (FIGS. 8A and 8B), streamer initiation (FIG. 8B), bundling (FIG. 8C), proliferation/growth (FIG. 8D), dispersal (FIG. 8E) and regrowth (FIG. 8F).

Example 5

Evaluation of Hydrodynamic Impact of Streamers on the Rising Velocity of a Droplet Observations of the microfluidic platform of Example 3 are made in the instant example.

Measurement of mean flow around a drop. To obtain time evolution of flow fields around an oil droplet in the microfluidic channel and the subsequent estimation of drag, micro Particle Image Velocimetry (μPIV) technique is implemented with a Nikon Ti-E transmission microscope and a large format high speed camera (IDT-NR4). The flow measurement area is 720×720 μm covering the entire droplet with the magnification of 20×. Note that since a 20× Nikon S Plan Fluor ELWD objective (numerical aperture=0.45) has the depth of field (DOF) of 5 μm, instantaneous flow measurements are averaged over a depth of 5 μm. The image plane is placed squarely at the center of the channel far away from all channel walls (approximately 45 μm from both the top and bottom wall). Each mean velocity field is measured at an interval of 10 min for the duration of each microcosm experiment.

Due to intrinsic fluctuations generated by the peristaltic pump, a regular periodic fluctuation at ~10 Hz is measured in the velocities. Each mean flow field at a given time is the direct result of ensemble averaging over 999 instantaneous velocity maps obtained from a sequence of high speed recording over 1 second period at the rate of 1000 fps. This one second recording period is short enough to "freeze" the flow at any given sampling time, but long enough to capture sufficient periods of flow fluctuations generated by the peristaltic pump. The calibration measurement of velocity in the same microchannel using a particle suspension at the same flow rate (148 ul·min$^{-1}$) as in experiment E7 (Table 1. FIGS. 9A-9D, 10A-10G, and 11) shows that within 1 second >9 periods of flow fluctuation were captured. An ensemble averaging over the entire 1 second period and was performed compared the mean field to that averaged over exactly 9 periods of flow fluctuation. It is shown that the mean error introduced is 0.3%. An average over the entire 1 s period per sequence was made indiscriminately without risk of introducing significant errors.

Bacteria cells were used as tracer particles for flow measurement. The justification is two-fold: Peclet number for the bacteria is much larger than 1 suggesting that bacterial cells act like solid passive particle and their swimming motility has only negligible influence on flow measurement; and Stokes number ($Stk=2/9\ (\rho_b/\rho_f)(d_b/D_d)^2 Re_D$, where $\rho_b$ is the bacterial cell density, $d_b$ is the characteristic size of bacterium. $D_d$ is droplet diameter, and $Re_D$ is Reynolds based on droplet diameter) are on the order of $10^{-5}$ that indicates bacteria cells behaving as solid particles will follow the flow streamlines.

μPIV techniques and procedures used to obtain the mean velocity field for each high speed sequence are summarized as follows. After the acquisition of each 1 s high speed sequence containing 1000 images spaced 1 ms apart in time, conventional cross-correlation based PIV analysis is applied to every two consecutive images in the sequence resulting in a total of 999 velocity maps. Note that the density of bacteria cells are sufficiently high in the experiments to adequately resolve flow around a droplet with 48 by 48 pixel windows at 16 pixel increments in the x- and y-directions.

Once an instantaneous velocity field per an image pair is calculated, a PIV-assisted Particle Tracking Velocimetry [PTV] is applied to these cell locations extracted from the image pair to obtain individual cell displacements. Approximately 3000 individual velocity vectors can be obtained per image pair. To highlight the ability to obtain highly resolved instantaneous velocity measurements, five randomly selected velocity maps were superimposed out of 999 in a high speed sequence in FIG. 9A. It is clear that a single instantaneous measurement resolves the flow field around a droplet with sufficient resolution, even in close proximity to the oil water interface. Each of unstructured PTV velocity maps is then interpolated onto structured grids with a resolution of 2.7 μm (or 4 pixels) in both x- and y-directions.

The mean velocity field for this image sequence is averaged over 999 instantaneous realizations. Due to intrinsic fluctuation from the pump, a estimation of the mean flow field at given time can be computed over a portion of each sequence covering sufficient fluctuations. As discussed above, the error introduced by averaging non-integer number of periods of flow fluctuation is only 0.3%. To expedite the processing of a large amount of data, the mean field was estimated using the entire 1 s sequence Hydrodynamic impact of streamers on the rising velocity of a droplet. To address the streamers' hydrodynamic impact, hydrodynamic drag was measured on an oil droplet with attached streamers directly. The experiment was conducted in the microfluidic platform at room temperature (20° C.) using model bacterium *Pseudomonas* (P62). After reaching mid-log growth ($OD_{600}$=0.41), the dense bacterial suspension is allowed to flow into the observation μchannel where a 240 μm droplet is pinned at $U_f$=2.2 mm s$^{-1}$ (or $U_f$=0.74$U_d$). Mean flow fields are measured at the mid-plane of the channel by a high speed camera at an interval of 10 min for several days.

Figures 9A, 9B, 9C, 9D:
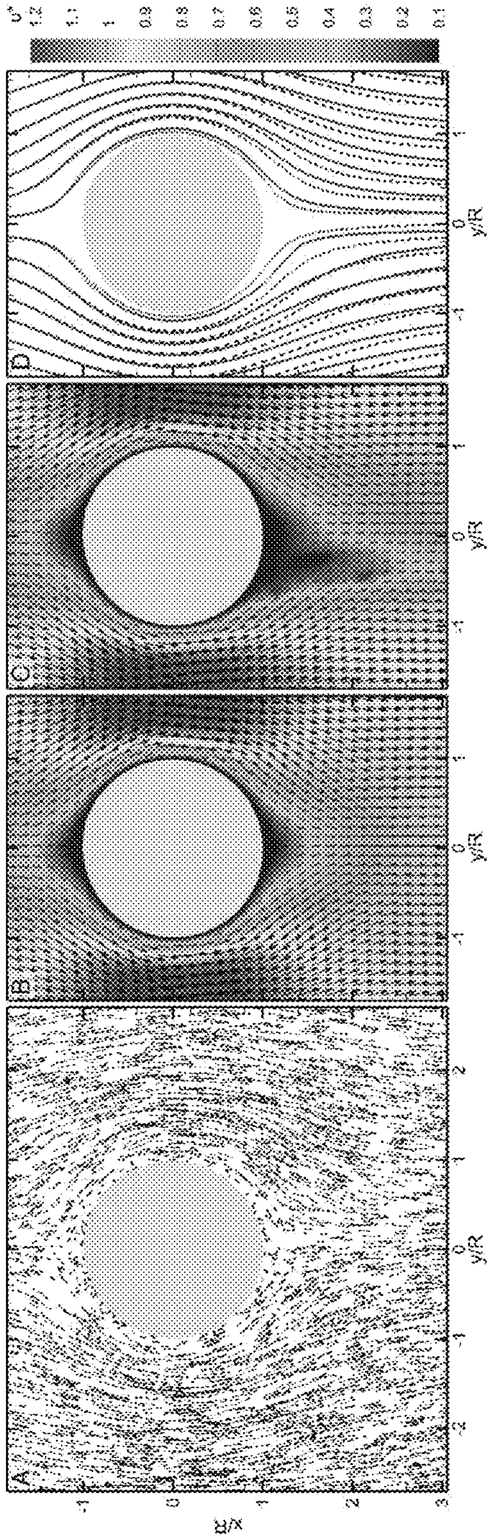

A sample flow field around a smooth droplet composed of 0.5% of total velocity measurement realizations near the start of the experiment (Δt=20 min after initial exposure to bacteria) before streamers have formed is shown in FIG. 9A. This unstructured velocity vector (totaling ~3×10$^6$ vectors per measurement) are ensemble averaged and interpolated onto a structured grid with a vector spacing of 2.7 μm using a Taylor expansion scheme to obtain highly resolved mean flow fields (FIGS. 9B-9D). Mean velocity fields are normalized with the mean flow speed, $U_f$, of the channel. Mean flow fields around a droplet with two trailing streamers (FIG. 9C) and without streamers (FIG. 9B) are shown as vector maps (displaying only every 7 in x- and every 5 vectors in y-axis) superimposed on their corresponding velocity magnitude fields (colored contours).

Flow around a smooth droplet (FIG. 9B) at $\Delta t$=20 min after exposure to bacteria demonstrates classic Stokes flow (i.e. symmetric front to back) around a circular profile. In contrast, the flow captured at $\Delta t$=30 min (FIG. 9C) and containing two trailing streamers shows a clearly developed “wake” region in FIG. 9C. These localized areas of low flow correlate directly to the presence of EPS streamers. To highlight the hydrodynamic impact of these streamers, these two fields were superimposed on top of each other using streamline pairs (FIG. 9D) where the dashed lines represent the flow in FIG. 9B (no streamer) and the solid red lines represent the flow in FIG. 9C (two streamers). Each pair of streamlines are initiated at the same upstream location. As evident in FIG. 9D, streamlines around a droplet with streamers deviate substantially from those from a smooth drop. Although observed in the upstream region (y/R<0), deviation is more pronounced behind the drop. This apparent widening of the spacing between two adjacent streamlines behind a droplet with streamers causes the development of an apparent “wake”.

At the current flow regime ($Re_{D_d}$=0.4, where $Re_{D_d}=\rho_f U_f D_d/\mu_f$ is the Reynolds number), the “wake” is unexpected and uncharacteristic. The substantial loss of fluid momentum behind a droplet with streamers compared to a smooth droplet compounded by the presence of a “wake” demonstrate that streamers, even only a couple, will greatly impact the hydrodynamic drag on the droplet and subsequently reduce its rising velocity drastically. In the following, the hydrodynamic impact of the streamers was quantify by directly estimating drag force on a drop. To accentuate the impact of isolated streamers on drag and subsequently the rising velocity of an oil droplet with them, analysis was focused on the first 100 minutes of experiments when isolated streamers are formed, detached and reformed.

With high resolution mean velocity fields resolved at every 10 minutes, the drag on the droplet was directly estimate with and without streamers by performing a control volume analysis of steady x-axis momentum balance:

$$Re_{D_d}(\vec{u}^*\cdot\vec{\nabla}^*)\vec{u}^*+\vec{\nabla}^*p^*-\vec{\nabla}\cdot\bar{\bar{\tau}}^*=0, \quad (1)$$

where the superscript “*” denotes the normalized quantities or operators. “$\nabla$” is the gradient operator, and $\bar{\bar{\tau}}^*=[\vec{\nabla}^*\vec{u}^*+(\vec{\nabla}^*\vec{u}^*)^T]$ is the normalized viscous stresses. Lengths are scaled by $D_d$, velocities by $U_f$, and stresses by $\mu_f U_f/D_d$. Briefly, the first term is the momentum deficit, the second represents the pressure gradient, and the third viscous stresses including shear (causing skin friction and streamer extension) and normal stress (causing pressure drag and bending of the streamer). Since both momentum ($1^{st}$) and viscous stress ($3^{rd}$) terms are sufficiently evaluated using velocity measurements, the often elusive pressure gradient ($2^{nd}$ term in Eq. 1) is estimated directly. Distributions of normalized pressure, $p^*=p/(2\,\mu U_f D_d^{-1})$, gradient magnitude are shown in FIGS. 10A-10G at a time interval of 10 min for the first 80 min of the experiment. As evident in FIGS. 10A-10G, although a single streamer is thin, transparent and unidentifiable in microscopic images, a single filament leaves a clear footprint in the pressure gradient fields, i.e. regions with elevated values collocated with the streamer.

Figures 10A, 10B, 10C, 10D, 10E, 10F, 10G:
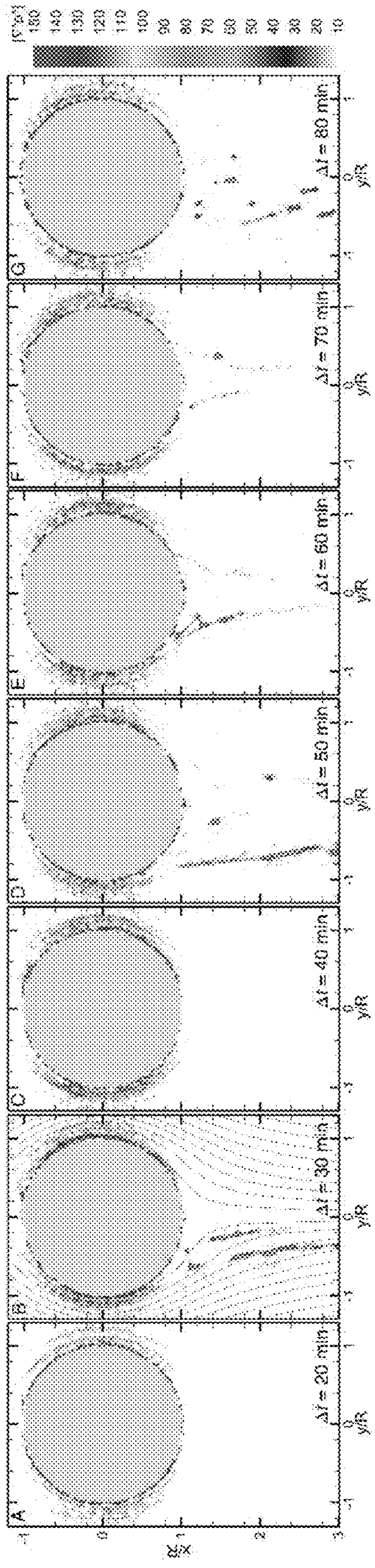

FIG. 10A shows the distribution of the pressure gradient magnitude around a smooth droplet with its corresponding flow (FIG. 9B). As expected, the pressure gradient is concentrated around the drop. In 10 min, two streamers with large pressure gradient are extruded from the left side of the droplet and elongated in x direction (FIG. 10B and corresponding flow in FIG. 9C). Note in FIG. 10B that these streamers clearly do not follow the streamlines (lines in FIG. 10B) behind a drop, but cross them due to the intrinsic elasticity of streamers theoretically predicted. At this early stage, streamer filaments are thin and have yet to form bundles. As shown in FIG. 10C, the two streamers observed in FIG. 10B 10 min earlier has since been detached and the flow is recovered. This cyclic process of streamer formation and detachment persists throughout the early stage of the droplet encountering the bacteria suspension, i.e. a streamer in the previous frame rarely survives to the next (FIGS. 10A-10G). As time progresses, streamers increase in number and survive longer by bundling together (FIG. 10G).

Figure 11:
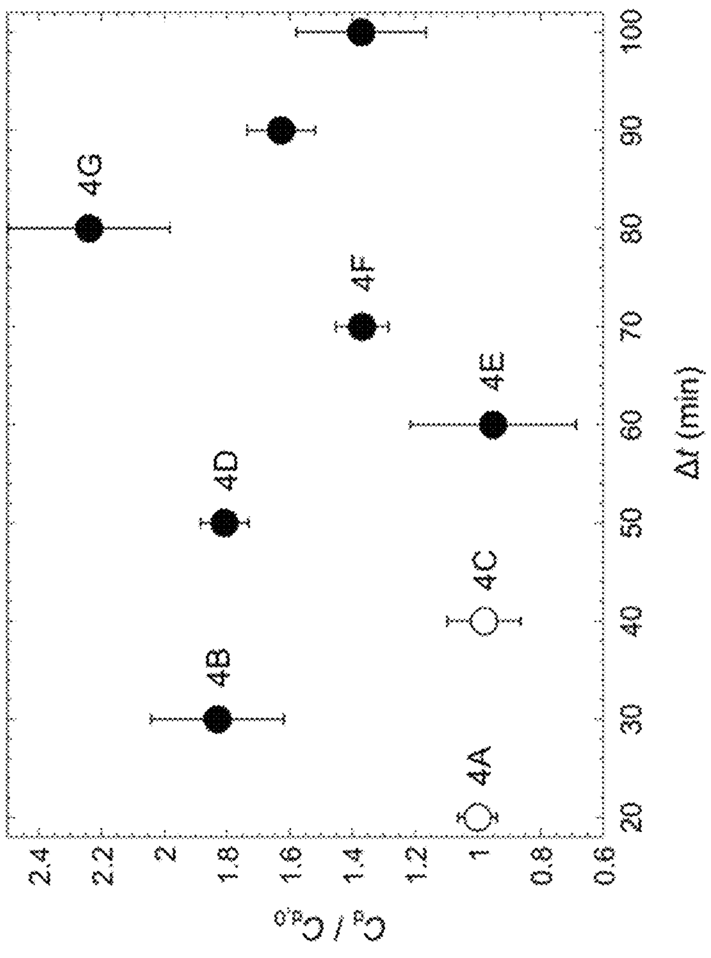

To estimate hydrodynamic drag on a droplet with streamers, an analysis was performed by balancing the momentum deficit, pressure forces and viscous stresses on a control volume enclosing both droplet and trailing streamers. Briefly, enclosing the droplet in a control volume with a control surface S, the drag force was determined by balancing total forces and momentum flux as the following:

$$F_d^*=-\int_S[Re_D(\vec{n}\cdot\vec{u}^*)\vec{u}_x^*+n_x p^*-\vec{n}\bar{\bar{\tau}}^*\cdot\vec{e}_x]dS^*, \quad (2)$$

where $F_d^*$ is the normalized drag force per unit length, $\vec{n}$ is the surface normal vector, and ix is the x-direction unit vector. Due to the limited measurement area of the velocity field, control volume is confined within a region close to the droplet ($x/D_p\in[-0.84, 1.425]$ and $y/D_p\in[-1.15, 1.15]$) and exclude a significant portion of the streamers, which underestimates the drag as well as imposes large uncertainties in the calculated pressure, momentum flux, viscous forces and subsequently the drag on droplets with streamers. To assess uncertainties in the drag measurement, each mean drag was estimated using 25 control volumes with a fixed size maximally allowable for the analysis but with a varying centroid. A mean drag force (or drag coefficient. $C_d=F_d/(0.5\rho^f U_f^2 D_d^2)$) is obtained by averaging estimations over these 25 fixed-size control volumes. The mean drag coefficients for each flow realization normalized by that of a smooth droplet (FIG. 10A) are presented in FIG. 11. The filled markers represent normalized drag coefficients for those instances when it has identified streamers, while open markers are for those without. Error bars are one standard deviation from the mean calculated from 25 control volume variations per time instance. FIG. 11 clearly shows that streamers increase drag on the droplet, even with only a few of them. For instance, at $\Delta t$=30 min, the presence of two streamers causes $C_d/C_{d,0}$ to increase by 80% (FIGS. 10B and 11), while 10 min later ($\Delta t$=40 min) the drag recovers immediately as they detach (FIGS. 10C and 11). Another short moment later, drag increases by 120% when four streamers are formed (FIGS. 10D and 11). Bearing in mind that the analysis only includes ~1.5$D_d$ downstream worth of a streamer that extends as long as >12$D_d$ downstream (FIG. 7F), these drag estimates presented here are highly conservative. Such a streamer bundle can cause a catastrophic reduction in droplets' rising velocities and consequently may substantially alter the fate of oil droplets.

The dramatic increase of drag by a single streamer was unexpected. Such a drastic increase in drag (>80%) cannot result from the frictional stress tangent to the streamer. As shown in FIG. 10B, streamers do not follow streamlines such that apart from conventional shear stress tangent to the filament, additional viscous stresses normal to the filament owing to the crossflow cause the widening of streamlines and the development of a "wake". Within this "wake", the pressure behind the droplet recovers slower than without streamers, which effectively increases the pressure difference before and after the droplet with streamers, drastically increasing the drag, a.k.a. pressure drag. Evidence can be further drawn from the measurement at $\Delta t$=60 min (FIG. 10E) that although two streamers are present, drag close to that of a smooth droplet is obtained. Inspection of FIG. 10E reveals that in this instance the majority portion of streamers approximately follow streamlines that supports the assertion that normal stresses and pressure, not friction (or shear), is the true origin of unexpected larger drag than frictional drag. In short, streamers crossing the streamlines modify the pressure field behind the droplet and drastically increase form drag that is normally absent in Stokes flow regimes.

Implication of streamers on the potential fate of oil droplets. In the kernel experiment from 9A-9D. 10A-10F, and 11, due to the formation of streamers, the drag increases rapidly (e.g. within 50 min in FIG. 11) and drastically (e.g. by more than 80% in 30 min in FIG. 11). An estimation shows that an 80% increase in drag (FIG. 10B) will result in a 33% slower rising velocity of a 100 μm droplet; a 100% increase (FIG. 10G) causes a 50% drop; and a 10-times increase causes a 90% slower rising velocity. Note that due to the limitation in the flow measurement, direct estimate the drag on a large aggregate that exceeds the field of view (720×720 μm) was not possible. However, it is expected to see a substantial increase (e.g. 10 times) in drag of a droplet with an elongated tail (e.g. >12 Da in FIG. 7F) and an enlarged cross-section (e.g. >2.5 $D_d$ in FIG. 8D). A 90% reduction in rising velocity for a 100 μm droplet would yield an increase in its residence time in a 100 m layer from 3 to 35 d, thus allowing ample time for many biotic processes including biodegradation and MOS formed directly in the deep-sea plume. The short initiation time scale of a streamer compounded with its strong impact on droplet hydrodynamics particularly provides us with a plausible mechanism to support field observations of biodegradation and sedimentation.

Additional examples can be found in White A R. Jalali M. Sheng J., "Hydrodynamics of a Rising Oil Droplet With Bacterial Extracellular Polymeric Substance (EPS) Streamers Using a Microfluidic Microcosm," *Frontiers in Marine Science,* 2020; 7 (294), incorporated herein in its entirety.

The invention claimed is:

1. A microfluidic platform comprising a microfluidic channel composition configured for establishing a liquid-liquid interface, wherein the microfluidic channel composition comprises poly(dimethylsiloxane) (PDMS), wherein the microfluidic channel composition comprises at least two inner walls configured to form a channel in the microfluidic channel composition, wherein at least one wall comprises poly(allylamine hydrochloride) (PAH), wherein at least one wall comprises poly(sodium 4-styrenesulfonate) (PSS), wherein the microfluidic platform comprises an oil droplet, and wherein the microfluidic platform further comprises a first recirculating loop configured for continuous observation of the oil droplet, and wherein the microfluidic platform further comprises a second recirculating loop configured for growth of a microbial culture.

2. The microfluidic platform of claim 1, wherein at least one wall comprises both PAH and PSS and wherein the PAH and the PSS are configured in layers on the at least one wall.

3. The microfluidic platform of claim 1, wherein the microfluidic channel composition comprises four fluid ports, wherein a first fluid port is an inlet configured for input of a liquid composition, wherein a second fluid port is an outlet configured for output of the liquid composition, wherein a third fluid port is an input configured for input of a buffer, and wherein a fourth fluid port is an input configured for input of an oil.

4. The microfluidic platform of claim 1, wherein the oil droplet is immobilized in the microfluidic channel composition.

5. The microfluidic platform of claim 1, wherein the oil droplet is configured in the microfluidic channel composition to allow a liquid composition to flow past the oil droplet.

6. The microfluidic platform of claim 5, wherein the liquid composition is a solution selected from the group consisting of a bacterial-containing solution, a viral-containing solution, a microorganism-containing solution, an antibody-containing solution, and a particle-containing solution.

7. The microfluidic platform of claim 5, wherein the liquid composition is a suspension selected from the group consisting of a bacterial-containing suspension, a viral-containing suspension, a microorganism-containing suspension, an antibody-containing suspension, and a particle-containing suspension.

8. The microfluidic platform of claim 1, wherein the microfluidic platform comprises a reservoir comprising a liquid composition configured for use in the first recirculating loop.

9. The microfluidic platform of claim 8, wherein the microfluidic platform comprises a first pump configured to withdraw the liquid composition from the reservoir.

10. The microfluidic platform of claim 1, wherein the microfluidic platform comprises an instrument for analysis.

11. The microfluidic platform of claim 10, wherein the instrument is a microscope.

12. The microfluidic platform of claim 10, wherein the instrument comprises a functionality selected from the group consisting of phase contrast, fluorescence, time lapse imaging, high speed imaging, and any combination thereof.

13. The microfluidic platform of claim 1, wherein the microfluidic channel composition comprises a coaxial nozzle.

14. The microfluidic platform of claim 1, wherein the coaxial nozzle is capable of immobilization of an oil droplet in the microfluidic channel composition.

15. The microfluidic platform of claim 1, wherein the oil droplet is between 1 μm and 100 μm in size.

16. The microfluidic platform of claim 1, wherein the oil droplet is pinned to the channel in the microfluidic channel composition.

17. A microfluidic platform comprising a microfluidic channel composition configured for establishing a liquid-liquid interface, wherein the microfluidic channel composition comprises poly(dimethylsiloxane) (PDMS), wherein the microfluidic channel composition comprises at least two inner walls configured to form a channel in the microfluidic channel composition, wherein at least one wall comprises poly(allylamine hydrochloride) (PAH), and wherein at least one wall comprises poly (sodium 4-styrenesulfonate) (PSS), a first recirculating loop configured for continuous observation of an oil droplet, and a second recirculating loop configured for growth of a microbial culture, wherein the microbial culture is grown in situ.

18. The microfluidic platform of claim 17, wherein the first recirculating loop is a closed loop system.

19. The microfluidic platform of claim 17, wherein the second recirculating loop is a closed loop system.

20. The microfluidic platform of claim 17, wherein the oil droplet is pinned to the channel in the microfluidic channel composition.

* * * * *